(12) United States Patent
Fedyk et al.

(10) Patent No.: US 11,344,979 B2
(45) Date of Patent: May 31, 2022

(54) BUILD PLATE CLAMPING-ASSEMBLY AND ADDITIVE MANUFACTURING SYSTEMS AND METHODS OF ADDITIVELY PRINTING ON WORKPIECES

(71) Applicant: General Electric Company, Schenectady, NY (US)

(72) Inventors: Glen Charles Fedyk, Fairfield Township, OH (US); Jinjie Shi, Mason, OH (US); Joseph Edward Hampshire, West Chester, OH (US); Richard Roy Worthing, Jr., Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 464 days.

(21) Appl. No.: 16/261,861

(22) Filed: Jan. 30, 2019

(65) Prior Publication Data
US 2020/0238447 A1   Jul. 30, 2020

(51) Int. Cl.
*B23K 26/042* (2014.01)
*B23K 26/142* (2014.01)
(Continued)

(52) U.S. Cl.
CPC .......... *B23P 6/007* (2013.01); *B23K 26/0006* (2013.01); *B23K 26/032* (2013.01);
(Continued)

(58) Field of Classification Search
CPC .............. B23K 26/0006; B23K 26/032; B23K 26/0861; B23K 26/142; B23K 26/342; B23K 26/042; B23K 26/702
(Continued)

(56) References Cited

U.S. PATENT DOCUMENTS 2,722,867 A   11/1955   Dackor et al.
5,415,384 A   5/1995   Obrist et al.
(Continued)

FOREIGN PATENT DOCUMENTS

CN   205950343 U   2/2017
CN   206299658 U   7/2017
(Continued)

OTHER PUBLICATIONS

Peng et al., Influence of Energy Density on Energy Demand and Porosity of 316L Stainless Steel Fabricated by Selective Laser Melting, International Journal of Precision Engineering and Manufacturing—Green Technology, vol. 5, No. 1, Jan. 2018, pp. 5562.
(Continued)

*Primary Examiner* — Thien S Tran
(74) *Attorney, Agent, or Firm* — Dority & Manning, P.A.

(57) ABSTRACT

A build plate-clamping assembly may include a work station having a build plate-receiving surface and a lock-pin extending from the build plate-receiving surface of the work station. The lock-pin may include a hollow pin body, a piston disposed within the hollow pin body, with the piston axially movable from a retracted position to an actuated position, and a plurality of detents, with the plurality of detents radially extensible through respective ones of a plurality of detent-apertures in the hollow pin body responsive to the piston having been axially moved to the actuated position. A methods of working on workpieces may include lockingly engaging a build plate at a first work station, performing a first work-step, releasing the build plate from the first work station, lockingly engaging the build plate at a second work station, and performing a second work-step. An additive manufacturing system may include a vision system with a first build plate-receiving surface and an
(Continued)

additive manufacturing machine with a second build plate-receiving surface.

20 Claims, 11 Drawing Sheets

(51) Int. Cl.
| | | |
|---|---|---|
| B23K 26/342 | (2014.01) | |
| B23K 26/00 | (2014.01) | |
| B23K 26/03 | (2006.01) | |
| B23K 26/08 | (2014.01) | |
| B23P 6/00 | (2006.01) | |
| F16B 21/16 | (2006.01) | |
| B25B 5/00 | (2006.01) | |
| B33Y 30/00 | (2015.01) | |
| B23K 26/70 | (2014.01) | |
| B23K 101/00 | (2006.01) | |

(52) U.S. Cl.
CPC ........ *B23K 26/042* (2015.10); *B23K 26/0861* (2013.01); *B23K 26/142* (2015.10); *B23K 26/342* (2015.10); *B25B 5/003* (2013.01); *B33Y 30/00* (2014.12); *F16B 21/165* (2013.01); *B23K 26/702* (2015.10); *B23K 2101/001* (2018.08)

(58) Field of Classification Search
USPC .......... 269/51, 133, 309; 411/265, 348, 349
See application file for complete search history.

(56) References Cited

U.S. PATENT DOCUMENTS

| | | | |
|---|---|---|---|
| 5,702,574 | A | 12/1997 | Foster et al. |
| 5,810,344 | A | 9/1998 | Nishimoto |
| 5,879,753 | A | 3/1999 | Zajchowski et al. |
| 5,913,555 | A | 6/1999 | Richter et al. |
| 6,161,826 | A | 12/2000 | Forrer |
| 6,401,000 | B1 | 6/2002 | Suzuki et al. |
| 6,435,596 | B1 | 8/2002 | Phillips |
| 6,449,529 | B1 | 9/2002 | Oleksy |
| 6,532,656 | B1 | 3/2003 | Wilkins et al. |
| 6,641,128 | B2 | 11/2003 | Fries |
| 6,895,350 | B2 | 5/2005 | Suzuki et al. |
| 6,908,288 | B2 | 6/2005 | Jackson et al. |
| 6,986,654 | B2 | 1/2006 | Imiolek et al. |
| 6,993,818 | B2 | 2/2006 | Smith et al. |
| 7,009,137 | B2 | 3/2006 | Guo |
| 7,034,246 | B2 | 4/2006 | Muylaert et al. |
| 7,261,550 | B2 | 8/2007 | Herzog |
| 7,357,629 | B2 | 4/2008 | Weiskopf et al. |
| 7,449,658 | B2 | 11/2008 | Mielke |
| 7,520,495 | B2 | 4/2009 | Stark |
| 7,587,818 | B2 | 9/2009 | Gorman et al. |
| 7,665,717 | B2 | 2/2010 | Lenzini |
| 7,674,107 | B2 | 3/2010 | Perret et al. |
| 7,790,096 | B2 | 9/2010 | Merot et al. |
| 8,056,606 | B2 | 11/2011 | Hasz |
| 8,801,502 | B2 | 8/2014 | Ng et al. |
| 8,875,392 | B2 | 11/2014 | Richter |
| 8,920,063 | B1 * | 12/2014 | Easley .................. F16B 21/165 403/328 |
| 8,996,156 | B2 | 3/2015 | Melzer-Jokisch et al. |
| 9,073,156 | B2 | 7/2015 | Clark et al. |
| 9,216,484 | B2 | 12/2015 | Bishop et al. |
| 9,283,593 | B2 | 3/2016 | Bruck et al. |
| 9,289,861 | B2 | 3/2016 | Czemer |
| 9,302,359 | B2 | 4/2016 | Hediger |
| 9,435,211 | B2 | 9/2016 | Xu |
| 9,452,474 | B2 | 9/2016 | Xu |
| 9,555,522 | B2 | 1/2017 | Evans et al. |
| 9,884,393 | B2 | 2/2018 | Roberts et al. |
| 9,919,474 | B2 | 3/2018 | Napadensky |
| 9,943,933 | B2 | 4/2018 | Zu et al. |
| 10,035,223 | B2 | 7/2018 | Ladewig et al. |
| 10,086,481 | B2 | 10/2018 | Krol et al. |
| 2002/0104973 | A1 | 8/2002 | Kerekes |
| 2003/0214571 | A1 | 11/2003 | Ishikawa et al. |
| 2004/0191064 | A1 | 9/2004 | Guo |
| 2007/0003416 | A1 | 1/2007 | Bewlay et al. |
| 2007/0063403 | A1 * | 3/2007 | Stark .................... B23Q 1/0072 269/309 |
| 2009/0226248 | A1 | 9/2009 | Wang |
| 2010/0028158 | A1 | 2/2010 | Richter |
| 2012/0054998 | A1 * | 3/2012 | Tschida ................. F16B 19/109 29/426.1 |
| 2012/0076578 | A1 * | 3/2012 | Schron, Sr. ........... F16B 21/165 403/376 |
| 2012/0085875 | A1 | 4/2012 | Hoyt et al. |
| 2014/0023426 | A1 | 1/2014 | Schron, Sr. et al. |
| 2014/0163717 | A1 | 6/2014 | Das et al. |
| 2014/0259668 | A1 | 9/2014 | Henderson et al. |
| 2015/0079306 | A1 | 3/2015 | Schoeneborn et al. |
| 2015/0165556 | A1 | 6/2015 | Jones et al. |
| 2015/0224607 | A1 | 8/2015 | Bruck et al. |
| 2015/0336271 | A1 | 11/2015 | Spicer et al. |
| 2016/0023403 | A1 | 1/2016 | Ramos et al. |
| 2016/0069184 | A1 | 3/2016 | Ribic et al. |
| 2016/0074965 | A1 | 3/2016 | Jakimov et al. |
| 2016/0159011 | A1 | 6/2016 | Marchione et al. |
| 2016/0167172 | A1 | 6/2016 | Goncharov et al. |
| 2016/0305777 | A1 | 10/2016 | Racine et al. |
| 2016/0318257 | A1 | 11/2016 | Brooks et al. |
| 2017/0009584 | A1 | 1/2017 | Cui et al. |
| 2017/0056975 | A1 | 3/2017 | Carter et al. |
| 2017/0106482 | A1 | 4/2017 | Roberts et al. |
| 2017/0165922 | A1 | 6/2017 | Hakkaku |
| 2018/0038385 | A1 | 2/2018 | Welch |
| 2018/0056393 | A1 | 3/2018 | Herzog et al. |
| 2018/0079033 | A1 | 3/2018 | Krueger et al. |
| 2018/0111319 | A1 | 4/2018 | Brezoczky et al. |
| 2018/0207875 | A1 | 7/2018 | Menchik |
| 2018/0236504 | A1 | 8/2018 | Pourcher et al. |
| 2018/0236556 | A1 | 8/2018 | Garay et al. |
| 2018/0238172 | A1 | 8/2018 | Garay et al. |
| 2018/0238173 | A1 | 8/2018 | Garay et al. |
| 2018/0243866 | A1 | 8/2018 | Srinivasan et al. |
| 2018/0363691 | A1 | 12/2018 | Gunner et al. |

FOREIGN PATENT DOCUMENTS

| | | |
|---|---|---|
| CN | 107399084 A | 11/2017 |
| CN | 207415989 U | 5/2018 |
| CN | 207630519 U | 7/2018 |
| CN | 108381916 A | 8/2018 |
| DE | 29907262 U1 | 7/1999 |
| DE | 102011102543 A1 | 11/2012 |
| DE | 102010001414 B4 | 5/2013 |
| DE | 102012011217 A1 | 12/2013 |
| DE | 102017115989 A1 | 1/2019 |
| EP | 1637274 A1 | 3/2006 |
| EP | 3103569 A1 | 12/2016 |
| EP | 3156152 A1 | 4/2017 |
| GB | 2181374 A | 4/1987 |
| GB | 2453945 | 4/2009 |
| JP | 2004/286086 A | 10/2004 |
| WO | WO2014/172496 A1 | 10/2014 |
| WO | WO2015118180 A1 | 8/2015 |
| WO | WO2017074373 A1 | 5/2017 |
| WO | WO2018145912 A1 | 8/2018 |

OTHER PUBLICATIONS

Gu et al., Influences of Energy Density on Porosity and Microstructure of Selective Laser Melted 17-4PH Stainless Steel. 24th International SFF Symposium—An Additive Manufacturing Conference, Aug. 16, 2013, pp. 474-489.

Liu et al., Effects of melt-pool geometry on crystal growth and micrstructure development in laser surface-melted superalloy single crystals, Mathematical modeling of single crystal growth in a melt

(56) References Cited

OTHER PUBLICATIONS pool (Part 1), Science Direct, Acta Materialia, vol. 52, 2004, pp. 4833-4847.
European Search Report Corresponding to Application No. 20151855 dated Jul. 27, 2020.
Mitee-Bite Products, LLC, Workholding Specialists, Aug. 2017 Catalog, 52 Pages.
Jones et al., Remanufacture of turbine blades by laser cladding, machining and in-process scanning in a single machine, Proceedings from 23$^{rd}$ Annual International Solid Freeform Fabrication Symposium, Aug. 16, 2012, pp. 821-827.

* cited by examiner

BUILD PLATE CLAMPING-ASSEMBLY AND ADDITIVE MANUFACTURING SYSTEMS AND METHODS OF ADDITIVELY PRINTING ON WORKPIECES

FIELD

The present disclosure generally pertains to additive manufacturing systems and methods of additively printing on workpieces, and more particularly to build plate-clamping assemblies configured to align a build plate with coordinates of an additive manufacturing system, as well as systems and methods related thereto.

BACKGROUND

According to the present disclosure, it would be desirable to utilize an additive manufacturing machine or system to additively print onto pre-exiting workpieces, including additively printing onto a plurality of pre-existing workpieces as part of a single build. When additively printing onto such workpieces, it would be desirable for additive manufacturing machines, systems, and methods to additively print onto pre-existing workpieces with sufficient precision and accuracy so as to provide near net shape components. Accordingly, there exists a need for improved additive manufacturing machines and systems, and methods of additively printing on workpieces.

The workpieces contemplated by the present disclosure include originally fabricated workpieces, as well as workpieces intended to be repaired, rebuilt, upgraded, and so forth, such as machine or device components that may experience damage, wear, and/or degradation throughout their service life. It would be desirable to additively print on workpieces such as machine or device components so as to repair, rebuild, or upgrade such components. It would also be desirable to additively print on workpieces so as to produce new components such as components that may exhibit an enhanced performance or service life.

One example of a machine or device component includes an air foil, such as a compressor blade or a turbine blade used in a turbomachine. These air foils frequently experience damage, wear, and/or degradation throughout their service life. For example, serviced air foils, such as compressor blades of a gas turbine engine show erosion, defects, and/or cracks after long term use. Specifically, for example, such blades are subject to significant high stresses and temperatures which inevitably cause blades to wear over time, particularly near the tip of the blade. For example, blade tips are susceptible to wear or damage from friction or rubbing between the blade tips and turbomachine shrouds, from chemical degradation or oxidation from hot gasses, from fatigue caused by cyclic loading and unloading, from diffusion creep of crystalline lattices, and so forth.

Notably, worn or damaged blades may result in machine failure or performance degradation if not corrected. Specifically, such blades may cause a turbomachine to exhibit reduced operating efficiency as gaps between blade tips and turbomachine shrouds may allow gasses to leak through the turbomachine stages without being converted to mechanical energy. When efficiency drops below specified levels, the turbomachine is typically removed from service for overhaul and repair. Moreover, weakened blades may result in complete fractures and catastrophic failure of the engine.

As a result, compressor blades for a turbomachine are typically the target of frequent inspections, repairs, or replacements. It is typically expensive to replace such blades altogether, however, some can be repaired for extended lifetime at relatively low cost (as compared to replacement with entirely new blades). Nevertheless, traditional repair processes tend to be labor intensive and time consuming.

For example, a traditional repair process uses a welding/cladding technique whereby repair material may be supplied to a repair surface in either powder or wire form, and the repair material may be melted and bonded to the repair surface using a focused power source such as a laser, e-beam, plasma arc, or the like. However, blades repaired with such a welding/cladding technique also undergo tedious post-processing to achieve the target geometry and surface finish. Specifically, due to the bulky feature size of the welding/cladding repair material bonded to the repair surface, the repaired blades require heavy machining to remove extra material followed by polishing to achieve a target surface finish. Notably, such machining and polishing processes are performed on a single blade at a time, are labor intensive and tedious, and result in large overall labor costs for a single repair.

Alternatively, other direct-energy-deposition (DED) methods may be used for blade repair, e.g., such as cold spray, which directs high-speed metal powders to bombard the target or base component such that the powders deform and deposit on the base component. However, none of these DED methods are suitable for batch processing or for repairing a large number of components in a time-efficient manner, thus providing little or no business value.

Accordingly, there exists a need for improved apparatuses, systems, and methods for additively manufacturing near net shape components that include an extension segment additively printed on a workpiece, including apparatuses, systems, and methods of repairing workpieces such as compressor blades and turbine blades.

BRIEF DESCRIPTION

Aspects and advantages will be set forth in part in the following description, or may be obvious from the description, or may be learned through practicing the presently disclosed subject matter.

In one aspect, the present disclosure embraces build plate-clamping assemblies. An exemplary build plate-clamping assembly may include a work station having a build plate-receiving surface and a lock-pin extending from the build plate-receiving surface of the work station. The lock-pin may include a hollow pin body, a piston disposed within the hollow pin body, with the piston axially movable from a retracted position to an actuated position, and a plurality of detents, with the plurality of detents radially extensible through respective ones of a plurality of detent-apertures in the hollow pin body responsive to the piston having been axially moved to the actuated position.

In another aspect, the present disclosure embraces methods working on workpieces at multiple work stations. An exemplary method may include lockingly engaging a build plate at a first work station, performing a first work-step on a plurality of workpieces secured to the build plate, releasing the build plate from the first work station, lockingly engaging the build plate at a second work station, and performing a second work-step on the plurality of workpieces secured to the build plate. The first work station may have a first lock-pin extending from a first build plate-receiving surface, and the build plate may include a socket configured to lockingly engage with the first lock-pin. The second work station may have a second lock-pin extending from a second build plate-receiving surface, and the socket of the build plate may also be configured to lockingly engage with the second lock-pin.

In yet another aspect, the present disclosure embraces additive manufacturing systems. An exemplary additive manufacturing system may include a vision system and an additive manufacturing machine. The vision system may include a first work station having a first build plate-receiving surface and a first lock-pin extending from the first build plate-receiving surface, with the first lock-pin configured to lockingly engage a build plate. The first lock-pin may have a first plurality of radially extensible detents, and the build plate may have a socket with an inside surface defining an engagement surface for the first plurality of radially extensible detents. The additive manufacturing machine may include a second work station having a second build plate-receiving surface and a second lock-pin extending from the second build plate-receiving surface. The second lock-pin may be configured to also lockingly engage the build plate, and the second lock-pin may have a second plurality of radially extensible detents. The inside surface of the socket of the build plate may define an engagement surface for the second plurality of radially extensible detents.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
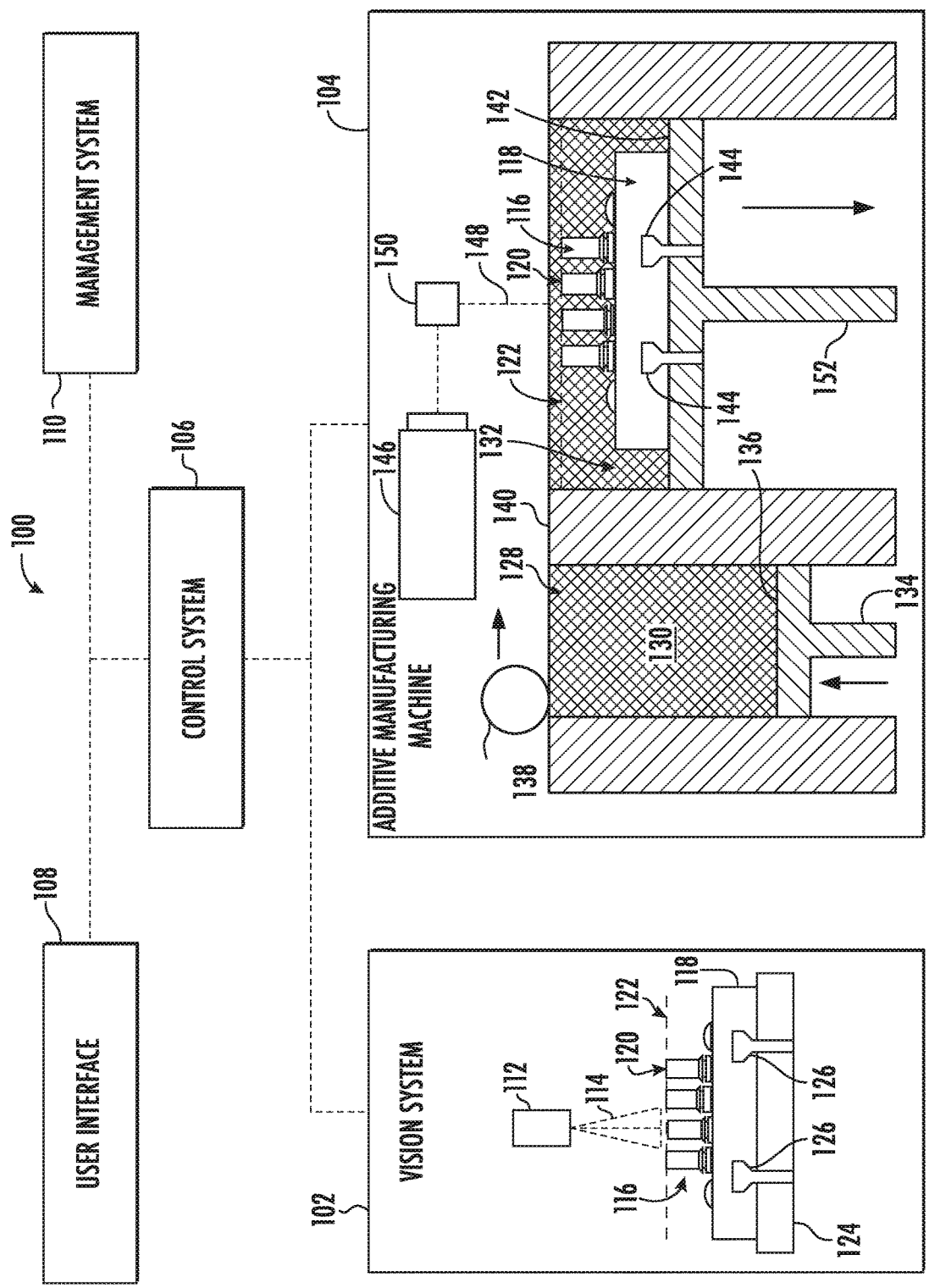
FIG. 1 schematically depicts an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

As described in detail below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

As used herein, the term "near net shape" refers to an additively printed feature that has an as-printed shape that is very close to the final "net" shape. A near net shape component may undergo surface finishing such as polishing, buffing, and the like, but does not require heaving machining so as to achieve a final "net" shape. By way of example, a near net shape may differ from a final net shape by about 1,500 microns or less, such as about 1,000 µm or less, such as about 500 µm or less, or such as about 100 µm or less or such as about 50 µm or less or such as about 25 µm or less.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in exemplary embodiments, several aspects and features of the present subject matter were previously not possible due to manufacturing restraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above enable much more complex and intricate shapes and contours of the components described herein to be formed with a very high level of precision. For example, such components may include thin additively manufactured layers, cross sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

The present disclosure generally provides additive manufacturing machines, systems, and methods configured to additively print on pre-existing workpieces. The pre-existing workpieces may include new workpieces as well as workpieces being repaired, rebuilt, or upgraded. In one aspect, build plate clamping-assemblies are provided that may be configured to align a build plate with coordinates of an additive manufacturing system with a high degree of precision and accuracy. The presently disclosed build plates may include sockets configured to fit within a socket-receiving recess with a tolerance selected to allow for thermal expansion during an additive manufacturing process, while still providing a highly precise and accurate locking engagement. For example, using the presently disclosed build plate-clamping assemblies, a build plate may be lockingly engaged with a work station within a tolerance of from about 10 micrometers to about 50 micrometers, such as from about 20 μm to about 30 μm, such as about 50 μm or less, such as about 35 μm or less, such as about 25 μm or less, or such as about 15 μm or less.

Exemplary build plate-clamping assemblies may include one or more lock-pins extending from a build plate-receiving surface of a work station. The one or more lock-pins may include one or more detents such as detent balls, which may be radially extensible so as to lockingly engage with one or more sockets of a build plate. The lock-pins may be pneumatically actuated so as to allow for quickly engaging and disengaging the build plate with the build plate-receiving surface. Alternatively, the lock-pins can be actuated using any desirable motive force, including an electrical actuator such as a piezoelectric switch, or a manual actuator such as a set screw.

The lock-pins may lockingly engage with the corresponding sockets of the build plate with sufficient accuracy and precision so as to align the build plate and/or one or more workpieces secured to the build plate to coordinates of the additive manufacturing system, including coordinates of a vision system and/or coordinates of an additive manufacturing machine. With the build plate and/or the one or more workpieces aligned to such coordinates, a vision system and an additive manufacturing machine may work in concert with one another, using the vision system to obtain digital representations of the workpieces, and using the additive manufacturing machine to additively print extension segments on the workpieces according to print commands generated based on the digital representations of the workpieces obtained from the vision system. For example, the digital representations may include the respective workpiece-interfaces of the workpieces, and the print commands may be configured to cause the additive manufacturing machine to additively print extension segments on the workpiece-interfaces so as to provide near net shape components.

The presently disclosed lock-pins may include flushing channels configured to allow a fluid to flush debris such as powder from the lock-pin, such as through one or more lock-pin apertures and/or one or more flushing apertures. The flushing channel provide for self-cleaning of the lock-pins so as to avoid powder from the additive manufacturing system from interfering with the operation of the lock-pins or prematurely wearing or damaging the various components that make up the build plate-clamping assembly.

The presently disclosed build plate-clamping assemblies, systems, and methods described herein allow for additively printing on the workpiece-interfaces of a plurality of workpieces simultaneously or concurrently as part of the same build. Among other advantages, such build plate-clamping assemblies may provide for improved productivity and reduced labor and time consumed when rebuilding workpieces. Additionally, alignment of the build plate and/or the one or more workpieces to additive manufacturing system coordinates facilitates production of near net shape components when additively printing extension segments on a plurality of workpieces.

Exemplary embodiments of an additive manufacturing system 100 are shown in FIG. 1. An exemplary additive manufacturing system 100 includes a vision system 102, an additive manufacturing machine 104, and a control system 106 operably configured to control the vision system 102 and/or the additive manufacturing machine 104. The vision system 102 and the additive manufacturing machine 104 may be provided as a single, integrated unit or as separate stand-alone units. The vision system 102 and the additive manufacturing machine 104 may be operably coupled with one another via a communication interface utilizing wired or wireless communication lines, which may provide a direct connection between the vision system 102 and the additive manufacturing machine 104. The control system 106 may include one or more control systems 106. For example, a single control system 106 may be operably configured to control operations of the vision system 102 and the additive manufacturing machine 104, or separate control systems 106 may be operably configured to respectively control the vision system 102 and the additive manufacturing machine 104. A control system 106 may be realized as part of the vision system 102, as part of the additive manufacturing machine 104, and/or as a stand-alone unit provided separately from the vision system 102 and/or the additive manufacturing machine 104. A control system 106 may be operably coupled with the vision system 102 and/or the additive manufacturing machine 104 via a communication interface utilizing wired or wireless communication lines, which may provide a direct connection between the control system 106 and the vision system 102 and/or between the control system 106 and the additive manufacturing machine 104. An exemplary additive manufacturing system 100 may optionally include a user interface 108 and/or a management system 110.

In some embodiments, a first control system 106 may generate one or more print commands and/or transmit the one or more print commands to a second control system 106, and the second control system 106 may cause the additive manufacturing machine 104 to additively print the extension segments based at least in part on the print commands. The first control system 106 may be realized as part of a vision system 102, and/or the second control system 106 may be realized as part of the additive manufacturing machine 104. Alternatively, or in addition, the first control system 106 and/or the second control system 106 may be realized stand-alone units separate from the vision system 102 and/or the additive manufacturing machine 104.

The vision system 102 may include any suitable camera or cameras 112 or other machine vision device that may be operably configured to obtain image data that includes a digital representation of one or more fields of view 114. Such a digital representation may sometimes be referred to as a digital image or an image; however, it will be appreciated that the present disclosure may be practiced without rendering such a digital representation in human-visible form. Nevertheless, in some embodiments, a human-visible image corresponding to a field of view 114 may be displayed on the user interface 108 based at least in part on such a digital representation of one or more fields of view 114.

The vision system 102 allows the additive manufacturing system 100 to obtain information pertaining to one or more workpieces 116 onto which one or more extension segments may be respectively additively printed. In particular, the vision system 102 allows the one or more workpieces 116 to be located and defined so that the additive manufacturing machine 104 may be instructed to print one or more extension segments on a corresponding one or more workpieces 116 with suitably high accuracy and precision. The one or more workpieces 116 may be secured to a build plate 118 with a workpiece-interface (e.g. a top surface) 120 of the respective workpieces 116 aligned to a build plane 122. The build plate 118 may be secured to a vision system-work station 124 with one or more vision system-lock-pins 126. The one or more vision system-lock-pins 126 may be configured according to the present disclosure so as to position the build plate 118 on the vision system-work station 124 with sufficiently high accuracy and precision.

The one or more cameras 112 of the vision system 102 may be configured to obtain two-dimensional or three-dimensional image data, including a two-dimensional digital representation of a field of view 114 and/or a three-dimensional digital representation of a field of view 114. Alignment of the workpiece-interfaces 120 with the build plane 122 allows the one or more cameras 112 to obtain higher quality images. For example, the one or more cameras 112 may have a focal length adjusted or adjustable to the build plane 122. With the workpiece-interface 120 of one or more workpieces 116 aligned to the build plane 122, the one or more cameras may readily obtain digital images of the workpiece-interfaces 120. The one or more cameras 112 may include a field of view 114 that that encompasses all or a portion of the one or more workpieces 116 secured to the build plate 118. For example, a single field of view 114 may be wide enough to encompass a plurality of workpieces 116, such as each of a plurality of workpieces secured to a build plate 118. Alternatively, a field of view 114 may more narrowly focus on an individual workpiece 116 such that digital representations of respective workpieces 116 are obtained separately. It will be appreciated that separately obtained digital images may be stitched together to obtain a digital representation of a plurality of workpieces 116. In some embodiments, the camera 112 may include a collimated lens configured to provide a flat focal plane, such that workpieces or portions thereof located towards the periphery of the field of view 114 are not distorted. Additionally, or in the alternative, the vision system 102 may utilize a distortion correction algorithm to address any such distortion.

Image data obtained by the vision system 102, including a digital representation of one or more workpieces 116 may be transmitted to the control system 106. The control system 106 may be configured to determine a workpiece-interface 120 of each of a plurality of workpieces 116 from one or more digital representations of one or more fields of view 114 having been captured by the vision system 102, and then determine one or more coordinates of the workpiece-interface 120 of respective ones of the plurality of workpieces 116. Based on the one or more digital representations, the control system 106 may generate one or more print commands, which may be transmitted to an additive manufacturing machine 104 such that the additive manufacturing machine 104 may additively print a plurality of extension segments on respective ones of the plurality of workpieces 116. The one or more print commands may be configured to additively print a plurality of extension segments with each respective one of the plurality of extension segments being located on the workpiece-interface 120 of a corresponding workpiece 116.

The additive manufacturing machine 104 may utilize any desired additive manufacturing technology. In an exemplary embodiment, the additive manufacturing machine may utilize a powder bed fusion (PBF) technology, such as direct metal laser melting (DMLM), electron beam melting (EBM), selective laser melting (SLM), directed metal laser sintering (DMLS), or selective laser sintering (SLS). The additive manufacturing machine 104 may include any such additive manufacturing technology, or any other suitable additive manufacturing technology may also be used. By way of example, using a powder bed fusion technology, respective ones of a plurality of extension segments may be additively printed on corresponding respective ones of a plurality of workpieces 116 in a layer-by-layer manner by melting or fusing a layer of powder material to the workpiece-interface 120. In some embodiments, a component may be additively printed by melting or fusing a single layer of powered material to the workpiece-interface 120. Additionally, or in the alternative, subsequent layers of powder material may be sequentially melted or fused to one another.

Still referring to FIG. 1, an exemplary additive manufacturing machine 104 includes a powder supply chamber 128 that contains a supply of powder 130, and a build chamber 132. A build plate 118 having one or more workpieces 116 secured thereto may be positioned in the build chamber 132, where the workpieces 116 may be additively printed in a layer-by-layer manner. The powder supply chamber 128 includes a powder piston 134 which elevates a powder floor 136 during operation of the system 100. As the powder floor 136 elevates, a portion of the powder 130 is forced out of the powder supply chamber 128.

A recoater 138, such as a roller or a blade, pushes some of the powder 130 across a work surface 140 and onto an additive manufacturing-work station 142. The build plate 118 may be secured to the additive manufacturing-work station 142 with one or more additive manufacturing machine-lock-pins 144. The one or more additive manufacturing machine-lock-pins 144 may be configured according to the present disclosure so as to position the build plate 118 on the additive manufacturing-work station 142 and/or within the build chamber 132 with sufficiently high accuracy and precision. The workpieces 116 may be secured to the build plate 118 prior to securing the build plate 118 to the additive manufacturing-work station 142. The recoater 138 fills the build chamber 132 with powder 130 and then sequentially distributes thin layers of powder 130 across a build plane 122 near the top of the workpieces 116 to additively print sequential layers of the workpieces 116. For example, the thin layers of powder 130 may be about 10 to 100 microns thick, such as about 20 to 80 μm thick, such as about 40 to 60 μm thick, or such as about 20 to 50 μm thick, or such as about 10 to 30 μm thick. The build plane 122 represents a plane corresponding to a next layer of the workpieces 116 to be formed from the powder 130.

To form a layer of an extension segment on the workpiece 116 (e.g., an interface layer or a subsequent layer), an energy source 146 directs an energy beam 148 such as a laser or an electron beam onto the thin layer of powder 130 along the build plane 122 to melt or fuse the powder 130 to the top of the workpieces 116 (e.g., to melt or fuse a layer to the workpiece-interfaces 120 and/or melt or fuse subsequent layers thereto). A scanner 150 controls the path of the beam so as to melt or fuse only the portions of the powder 130 layer that are to become melted or fused to the workpieces 116. Typically, with a DMLM, EBM, or SLM system, the powder 130 is fully melted, with respective layers being melted or re-melted with respective passes of the energy beam 148. Conversely, with DMLS, or SLS systems, layers of powder 130 are sintered, fusing particles of powder 130 with one another generally without reaching the melting point of the powder 130. After a layer of powder 130 is melted or fused to the workpieces 116, a build piston 152 gradually lowers the additive manufacturing-work station 142 by an increment, defining a next build plane 122 for a next layer of powder 130 and the recoater 138 to distributes the next layer of powder 130 across the build plane 122. Sequential layers of powder 130 may be melted or fused to the workpieces 116 in this manner until the additive printing process is complete.

Figure 2:
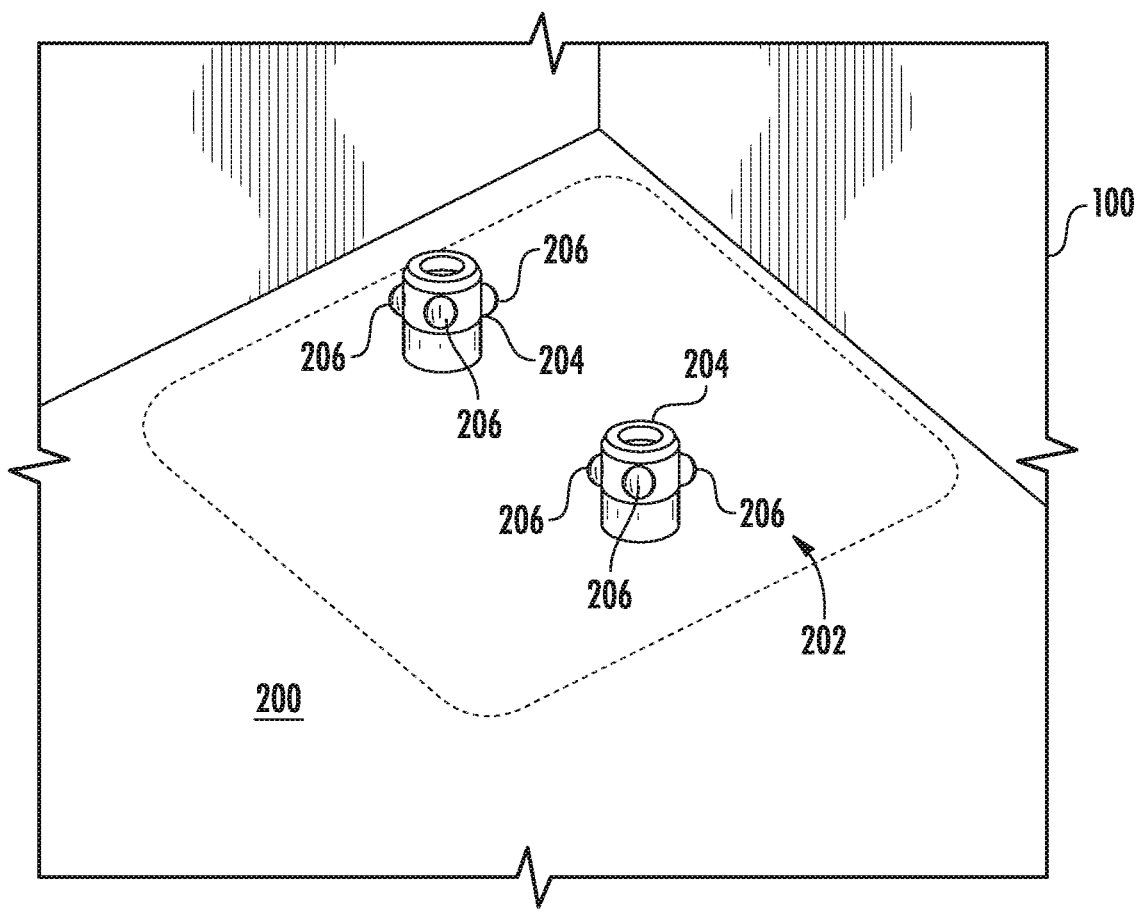
FIG. 2 schematically depicts an exemplary work station.
Figure 3:
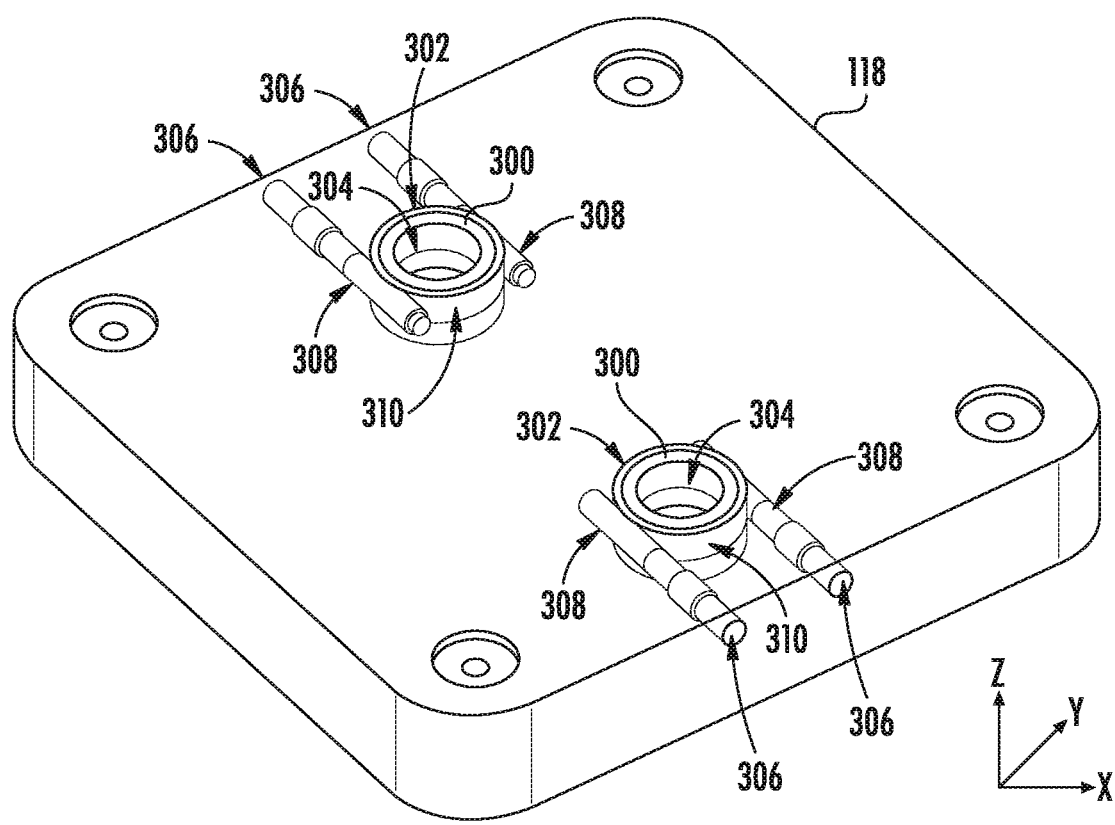
FIG. 3 schematically depicts an exemplary build plate corresponding to the work station depicted in FIG. 2.

Now referring to FIGS. 2 and 3, an exemplary build plate-clamping assembly will be described. An exemplary build plate-clamping assembly includes a work station 200, such as the work station shown in FIG. 2. An exemplary build plate-clamping assembly may additionally include a build plate 118 corresponding to the work station, such as shown in FIG. 3. The work station 200 shown in FIG. 2 may depict a vision system-work station 124 and/or an additive manufacturing-work station 142. As shown in FIG. 2, an exemplary work station 200 includes a build plate-receiving surface 202, and one or more lock-pins 204 extending from the build plate-receiving surface 202 of the work station 200. The one or more lock-pins 204 include one or more detents 206 such as detent balls or other locking elements extensible radially from the respective lock-pin 204. The use of one or more lock-pins 204 that include detents 206 advantageously allow for the build plate 118 to be secured to the build-plate receiving surface 202, while also allowing for the build plate 118 to be aligned laterally, vertically, and rotationally with respect to the build-plate-receiving surface 202.

While two lock-pins 204 are shown in FIG. 2, it will be appreciated that the depicted embodiment is provided by way of example and not to be limiting. In fact, any desired number of lock-pins 204 may be provided without departing from the spirit and scope of the present disclosure, such as, for example, at least one lock-pin 204, at least two lock-pins 204, at least three lock-pins 204, or at least four lock-pins 204. Additionally, while the lock-pins depicted in FIG. 2 include a plurality of detents 206, it will be appreciated that the number of detents 206 depicted is provided by way of example and not to be limiting. Various embodiments of a lock-pin 204 may include any desired number of detents 206 without departing from the spirit and scope of the present disclosure, including, for example, at least one detent 206, at least two detents 206, at least three detents 206, or at least four detents 206.

The number of lock-pins 204 and/or the number of detents 206 may be selected, for example, to increase the hold-down or security with which the build plate 118 is secured to the build-plate. In addition to the lock-pins 204, the build plate-receiving surface 202 may include other features that may help align a build plate 118 with the build plate-receiving surface 202, such as grooves, notches, ridges, pins, recesses, and so forth which may be configured to mate with corresponding features of the build plate 118. Such other features may be configured to provide vertical, lateral, and/or rotational alignment of the build plate 118 with the build plate-receiving surface 202.

Now referring to FIG. 3, various aspects of an exemplary build plate 118 will be described. A build plate 118 may include one or more features corresponding to the build plate-receiving surface 202 of the work station 200, so as to allow the build plate 118 to be clamped to the work station 200 at least in part by one or more lock-pins 204. As shown in FIG. 3, an exemplary build plate 118 includes one or more sockets 300 configured and arranged about the build plate 118 so as to correspond to one or more lock-pins 204 of the work station 200. A socket 300 may define an integral, seamless portion of the build plate 118. Alternatively, as shown, a socket 300 may installed in a socket-receiving recess 302 in the build plate, such as with an interference fit. The interference fit may be sized so as to allow the socket 300 to float within the socket-receiving recess 302 with a tolerance selected to allow for thermal expansion during an additive manufacturing process. In an alternative embodiment, the socket 300 may be fixed to the build plate 118 and the lock-pins 204 may be allowed to float, for example, so as to similarly allow for thermal expansion during an additive manufacturing process.

Regardless of whether a socket 300 defines an integral, seamless portion of the build plate 118 or is installed in a socket-receiving recess 302, the socket 300 may include an inside surface 304 defining an engagement surface configured to allow the lock-pin to lockingly engage with the socket 300. The engagement surface may extend across all or a portion of the inside surface 302 of the socket 300, and through a portion of the build plate 118 or entirely through the build plate 118.

In some embodiments, the engagement surface may include one or more recesses corresponding to respective ones of the detents 206, so as to provide rotational alignment of the build plate 118 with the build plate-receiving surface 202. In this way, a single lock-pin 204 may provide both lateral alignment and rotational alignment of the build plate 118 with the build plate-receiving surface 202.

In some embodiments, a variety differently configured sockets 300 may be interchangeably installed in a socket-receiving recess 302. For example, differently configured sockets 300 may be provided so as to accommodate differently configured lock-pins 204. While two sockets 300 are shown in FIG. 3, it will be appreciated that the depicted embodiment is provided by way of example and not to be limiting. In fact, any desired number of sockets 300 may be provided without departing from the spirit and scope of the present disclosure, such as, for example, at least one socket 300, at least two sockets 300, at least three sockets 300, or at least four sockets 300. The number of sockets 300, however, will typically correspond in number to at least the number of lock-pins 204 provided on a build plate-receiving surface 202 of a work station 200. However, in some embodiments, the number of sockets 300 may exceed the number of lock-pins 204 provided on a build plate-receiving surface 202 of a work station 200. In some embodiments, a plurality of build plate-receiving surfaces 202 may be defined on a work station 200, such that the work station 200 may receive may receive a plurality of build plates 118, and/or such that the work station 200 may receive a variety of different build plates 118, such as build plates 118 that differ in respect of the number and/or configuration of sockets 300.

Still referring to FIG. 3, in some embodiments, when the sockets 300 are installed in a socket-receiving recess 302, the build plate 118 may additionally include one or more socket bolt-receiving bores 306 intersecting a socket-receiving recess 302. The one or more socket bolt-receiving bores 306 may be configured to receive a socket locking-bolt 308, and such as socket locking-bolt 308 may be insertable therein such as by a threaded fit and/or an interference fit. The socket 300 may be lockingly engageable with the build plate 118 (e.g., with the socket-receiving recess 302) at least in part by one or more socket bolts 308 having been inserted into corresponding socket bolt-receiving bores 306. For example, an outside surface of a socket 300 may include a socket bolt-engaging channel 310 disposed about at least a portion of the outer surface of the socket 300. The location of the socket bolt-engaging channel 310 may be selected to align with the socket bolt-receiving bore 306 intersecting the socket-receiving recess 302, such that the socket locking-bolt 308 may lockingly engage with the socket bolt-engaging channel 310.

In an exemplary embodiment, a build plate 118 may include a first a socket bolt-receiving bore 306 intersecting a first side of a socket-receiving recess 302 and a second a socket bolt-receiving bore 306 intersecting a second side of the socket-receiving recess 302. The first socket bolt-receiving bore 306 may be configured to receive a first socket locking-bolt 308 insertable therein, and the second socket bolt-receiving bore 306 may be configured to receive a second socket locking-bolt 308 insertable therein. The first socket bolt-receiving bore 306 and the second socket bolt-receiving bore 306 may align with a socket bolt-engaging channel 310 on the outside surface of the socket 300. The socket 300 may be lockingly engageable with the build plate 118 at least in part by the first socket locking-bolt 308 having been inserted into the first socket bolt-receiving bore 306 and engaging with the socket bolt-engaging channel 310 and/or the second socket locking-bolt 308 having been inserted into the second socket bolt-receiving bore 306 and engaging with the socket bolt-engaging channel 310.

Figure 4:
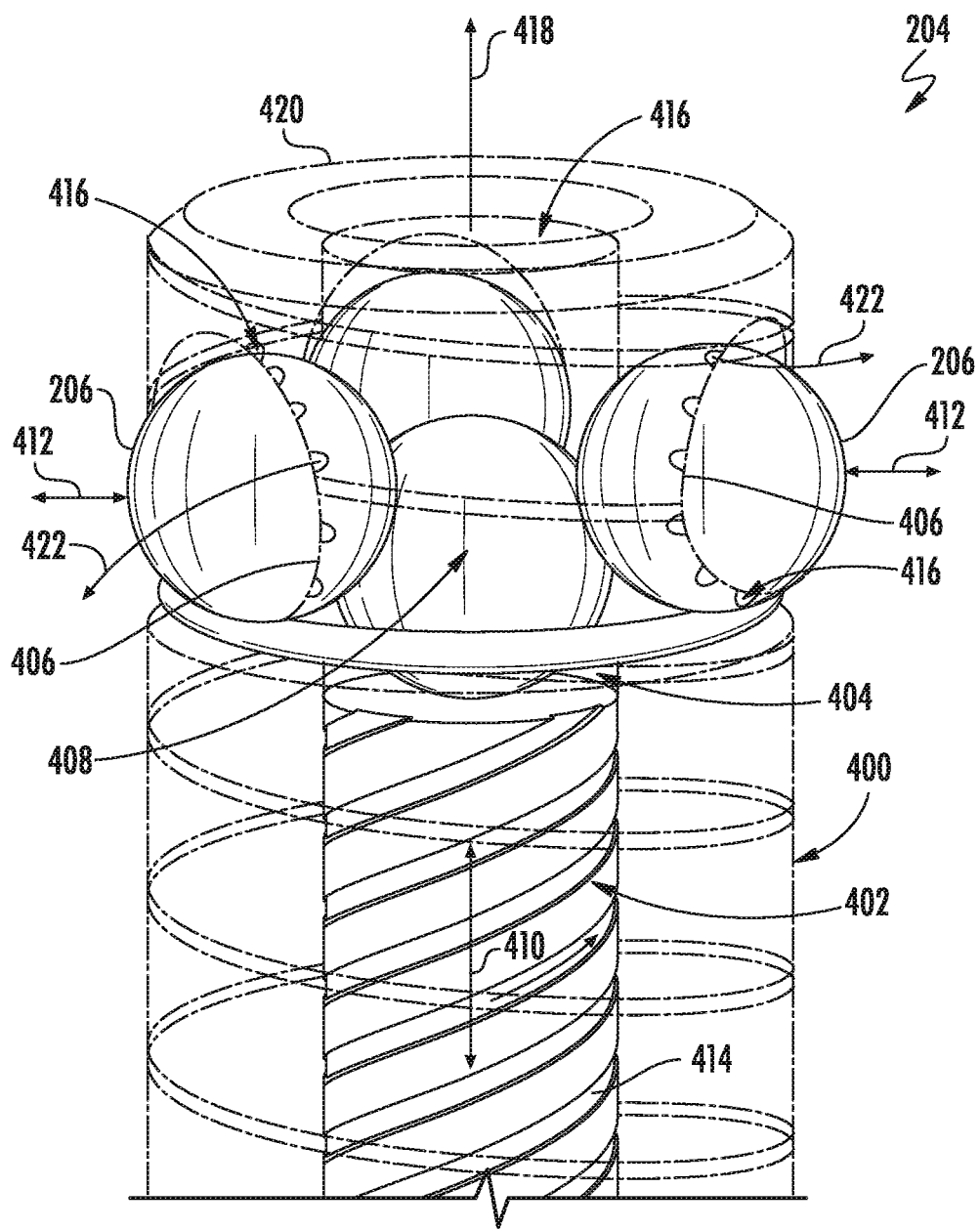
FIG. 4 schematically depicts an exemplary lock-pin, which may be included with the work station depicted in FIG. 2.

Now referring to FIG. 4, further aspects of an exemplary lock-pin 204 will be described. As shown, an exemplary lock-pin 204 may include a hollow pin body 400 a piston 402 disposed within the hollow pin body 400, such as within an axial piston pathway 404 configured and arranged to receive the piston 402. The piston 402 may be axially movable so as to actuate and retract one or more detents 206. The piston 402 may be axially movable from a retracted position located axially distal from the one or more detents 206 to an actuated position located axially proximal to the one or more detents 206. The one or more detents 206 may be extensible radially from the respective lock-pin 204 through corresponding detent-apertures 406 in the hollow pin body 400 responsive to the piston 402 having been axially moved to the actuated position. The piston 402 may be actuable by any desired means, including a mechanical piston 402 actuable by a mechanical lever or the like, a pneumatic piston 402 actuable by a pneumatic fluid, a hydraulic piston 402 actuable by a hydraulic fluid, a magnetic piston 402 actuable by a magnetic source such as an electromagnet, and so forth.

In some embodiments, a lock-pin 204 may include a wedging element 408 disposed within the hollow pin body 400 between the piston 402 and the one or more detents 206. The one or more wedging elements 408 may have a sloped or curved surface that slidably translates an axial movement 410 of the piston 402 to a radial movement (e.g., a radial extension and/or a radial retraction) 412 of the one or more detents 206. For example, the one or more wedging elements 408 may radially extend the one or more detents 206 responsive to the piston 402 having been axially moved to the actuated position.

The one or more detents 206 may have any desired shape suitable for extending radially from the detent-apertures 406 through radial movement 412 responsive to slidably translating movement of a wedging element 408. The one or more wedging elements 408 may have any desired shape that provides a suitably sloped or curved surface that slidably translates an axial movement 410 of the piston 402 to a radial movement 412 of the one or more detents 206. As shown in FIG. 4, the detents 206 and the wedging element 408 both have a spherical shape. However, it will be appreciated that a detent 206 and/or a wedging element 408 may be configured according to other suitable shapes, including frustoconical shapes and polyhedral shapes. In some embodiments, the wedging element 408 may be an integral part of the piston 402, or the wedging element 408 may be omitted and the piston 402 may slidably translate axial movement 410 to a radial movement 412 of the one or more detents 206. The spherical shaped detents 206 and the spherical shaped wedging element 408 may be desirable, however, so as to reduce friction between and allow the one or more detents 206 and/or the one or more wedging elements 408 to rotate freely within the hollow pin body 400, against the detent-apertures 406, and/or against the engagement surface of the socket 300.

A detent-aperture 406 may provide an opening of sufficient size to allow a detent 206 to radially extend partially therethrough such that the detent 206 may lockingly engage with the engagement surface. A cross-sectional width of a detent-aperture 406 may be less than a cross-sectional width of a detent 206 so as to prevent the detent 206 from falling out of the detent-aperture 406.

Figure 5A:
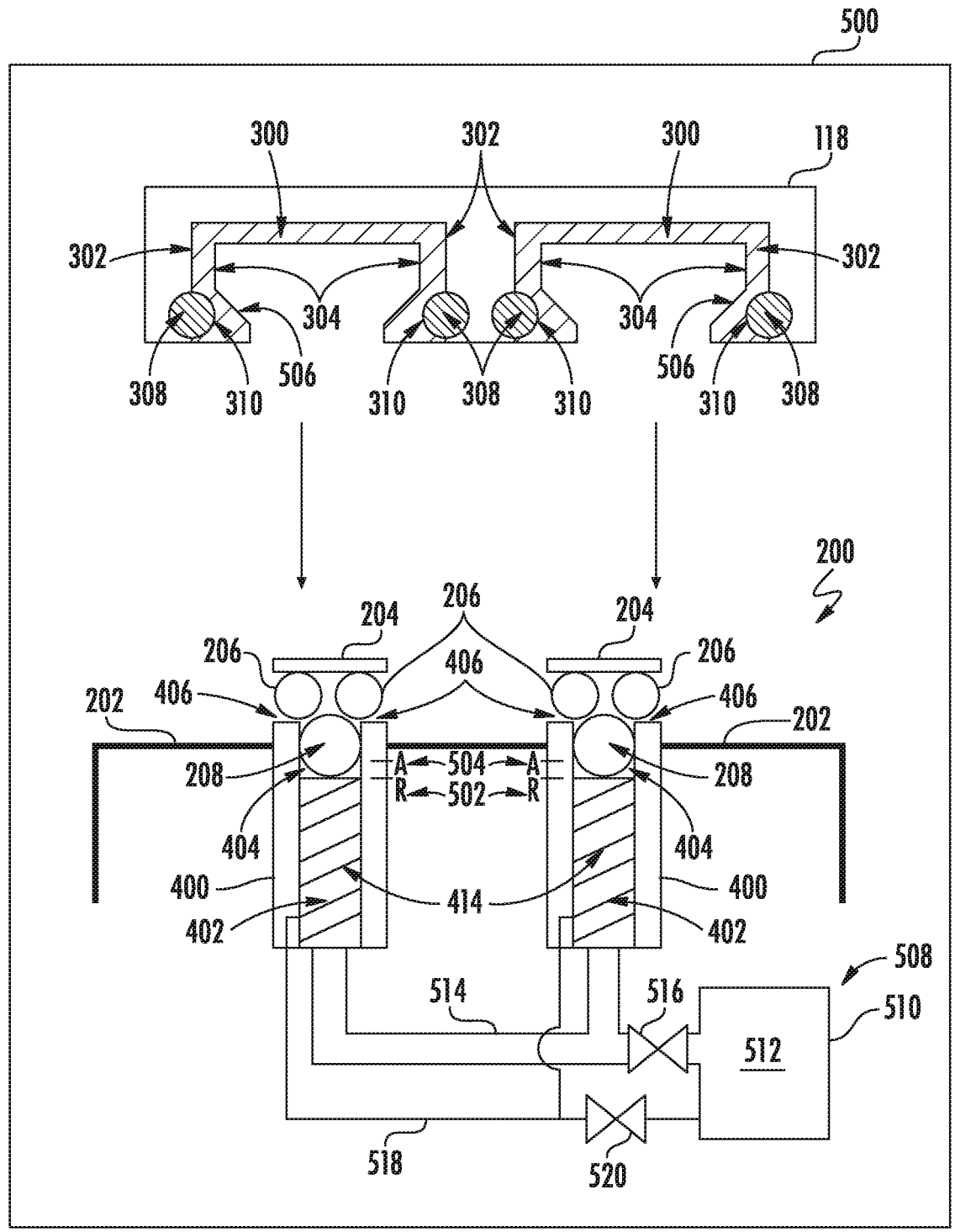
FIGS. 5A-5C schematically depict aspects of a build plate-clamping assembly, which may include the work station depicted in FIG. 2 and the build plate depicted in FIG. 3.
Figure 5B:
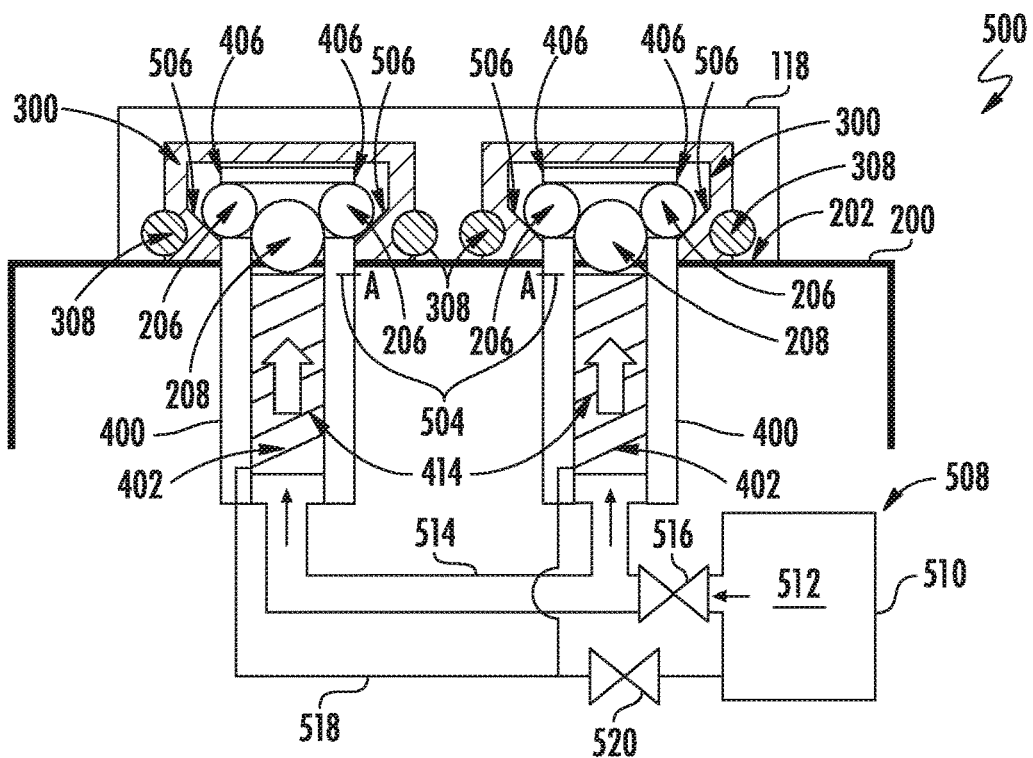
Figure 5C:
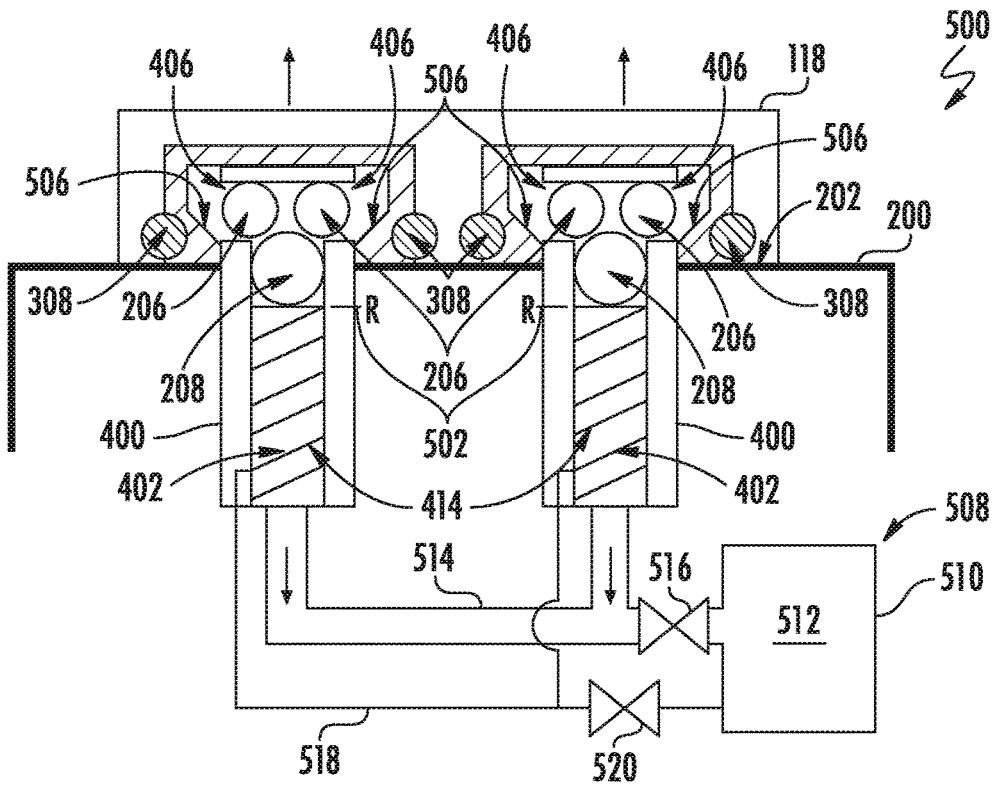

Referring now to FIGS. 5A-5C, further aspects of a build plate-clamping assembly 500 will be described. As shown in FIGS. 5A-5C, an exemplary build-plate clamping assembly 500 may include a work station 200 having a build plate-receiving surface 202, and one or more lock-pins 204 extending from the build plate-receiving surface 202 of the work station 200. The one or more lock-pins 204 may include a hollow pin body 400, a piston 402 disposed within the hollow pin body 400. The piston is axially movable from a retracted position 502 to an actuated position 504, such that the piston 402 may actuate one or more detents 206 of respective ones of the one or more lock-pins 204. The one or more detents 206 may be radially extensible through respective ones of a plurality of detent-apertures 406 in the hollow pin body 400 responsive to the piston 402 having been axially moved to the actuated position 504.

The build-plate clamping assembly 500 may additionally include a build plate 118 configured to be clamped to the work station 200 at least in part by the one or more lock-pins 204. The build plate 118 may include one or more sockets 300 that have an inside surface 304 defining an engagement surface 506 for the one or more detents 206 to lockingly engage the respective one of the one or more lock-pins 204 with the corresponding one of the one or more sockets 300. In some embodiments, the engagement surface 506 may include an undercut, notch, groove, chamfer, or the like configured to lockingly engage the one or more detents 206.

To lockingly engage a build plate 118 with a build plate-receiving surface 202 of a work station 200, the build plate 118 may be positioned onto the build plate-receiving surface 202, with the one or more lock-pins 204 fitting into a corresponding socket 300. The build plate-clamping assembly 500 may include a fluid system 508 configured to actuate the one or more lock-pins 204. The fluid system may include a fluid source 510, which may include a fluid reservoir, a pump, and/or a compressor. The fluid source 510 may contain a fluid 512, such as a pneumatic fluid or a hydraulic fluid. A piston 402 of a lock-pin 204 may be actuable by the fluid 512, which may be supplied to a distal end of the piston 402, which may be in fluid communication with the fluid source 510 via one or more piston fluid supply lines 514. In some embodiments, a fluid supply valve 516 may be positioned at the one or more fluid supply lines. The fluid supply valve 516 may be movable to an open position to actuate the piston 402, moving the piston to the actuated position 504, and the fluid supply valve 516 may be movable to a closed position to retract the piston, moving the piston to the retracted position 502.

The fluid source 510 may also supply fluid 512 to the flushing channel 414, such as via one or more flushing fluid supply lines 518. Optionally, a flushing fluid supply valve 520 may be positioned at the one or more fluid supply lines 518 so as to activate and deactivate a flow of fluid 512 to the flushing channel 414. In some embodiments, at least a portion of the one or more flushing fluid supply lines 518 may define a pathway through a hollow pin body 400 of a lock-pin 204. The flushing channel 414 and the pathway of the flushing fluid supply line 518 through the hollow pin body 400 may be configured to align and thereby fluidly communicate with one another when the piston 402 moves to a retracted position 502 and/or when the piston 402 moves to an actuated position 504. In some embodiments, fluid communication between the flushing channel 414 and the flushing fluid supply line 518 may be established when the piston 402 moves to a retracted position 502, such that debris may be flushed from the lock-pin 204 when the piston 402 moves to the retracted position 502. For example, fluid 512 flow through the flushing channel 414 may be activated when removing a build plate 118 from a work station 200. In this way, the fluid 512 flowing through the flushing channel 414 may prevent debris such as powder 130 from falling into the lock-pin 204 when removing the build plate 118 and/or the fluid 512 may flush any such debris from the lock-pin 204 that may otherwise accumulate in and/or around the lock-pin 204.

FIG. 5B shows a build plate 118 lockingly engaged with a build plate-receiving surface 202 of a work station 200. The fluid supply valve 516 is in an open position allowing fluid 512 to move a plurality of pistons 402 to an actuated position 504. The pistons 402 move a respective wedging element 408 disposed within the hollow pin body 400 of the lock-pin 204 between the piston and the plurality of detents 206. The wedging element 408 includes a sloped or curved surface configured to allow the wedging element 408 to slidably translates an axial movement 410 of the piston 402 to a radial extension of a plurality of detents 206 responsive to the piston 402 having been axially moved to the actuated position 504. The plurality of detents 206 extend radially from corresponding detent-apertures 406, thereby lockingly engaging with the engagement surface 506 of the sockets 300 corresponding to the respective lock-pins 204. Any suitable piston 402 may be utilized, including a spring acting piston 402, a spring return piston 402, and/or a spring extend piston 402. In an exemplary embodiment, the piston 402 may be a spring extend piston 402, which advantageously prevents the piston 402 from retracting in the event of a loss in air pressure.

FIG. 5C shows a build plate 118 situated on the build plate-receiving surface 202 of a work station 200, with fluid supply valve 516 in a closed position allowing the plurality of pistons 402 to move to a retracted position 502. With the pistons 402 moved to the retracted position 502, the wedging element 408 and the detents 206 may retract into the hollow body of the piston 402, thereby disengaging the detents 206 from the engagement surface 506 of sockets 300 corresponding to the respective lock-pins 204. With the detents 206 disengaged from the engagement surface 506, the build plate 118 may be removed from the build plate-receiving surface 202.

Referring again to FIG. 4, in some embodiments, a lock-pin 204 may include a flushing channel 414 defining a pathway for a fluid 512 to flow from a fluid source 510 and discharge from the hollow pin body 400 so as to flush debris from the lock-pin 204. The flushing channel 414 may be formed within the piston 402 and/or the hollow pin body 400 of the lock-pin 204. In some embodiments, the flushing channel 414 may traverse helically along the piston 402 and/or the flushing channel 414 may traverse helically along the inner surface of the hollow piston body 400. While a single flushing channel 414 is shown, it will be appreciated that any number of flushing channels 414 may be provided, such as at least one flushing channel, at least two flushing channels, and so forth, without departing from the spirit and scope of the present disclosure.

One or more flushing channels 414 may be in fluid communication with the plurality of detent-apertures 406 so as to allow the fluid 512 to flush debris such as powder 130 from the lock-pin 204 through the plurality of detent-apertures 406. Additionally, or in the alternative, a lock-pin 204 may include one or more flushing apertures 416 disposed about the hollow pin body 400. The one or more flushing apertures 416 may be in fluid communication with the one or more flushing channels 414 so as to allow the fluid 512 to flush debris such as powder 130 from the lock-pin 204. An exemplary flushing pathway 418 may discharge through one or more flushing apertures 416 disposed at a proximal end 420 of the hollow pin body 400. Another exemplary flushing pathway 422 may additionally or alternatively discharge through a plurality of flushing apertures 416 disposed about at least one of the plurality of detent-apertures 406. The flushing channels 414 may be utilized before, during, and/or after lockingly engaging a build plate 118 at a work station 200 (e.g., before, during, and/or after the plurality of detents 206 have lockingly engaged the lock-pin 204 with the socket 300).

Figure 6A:
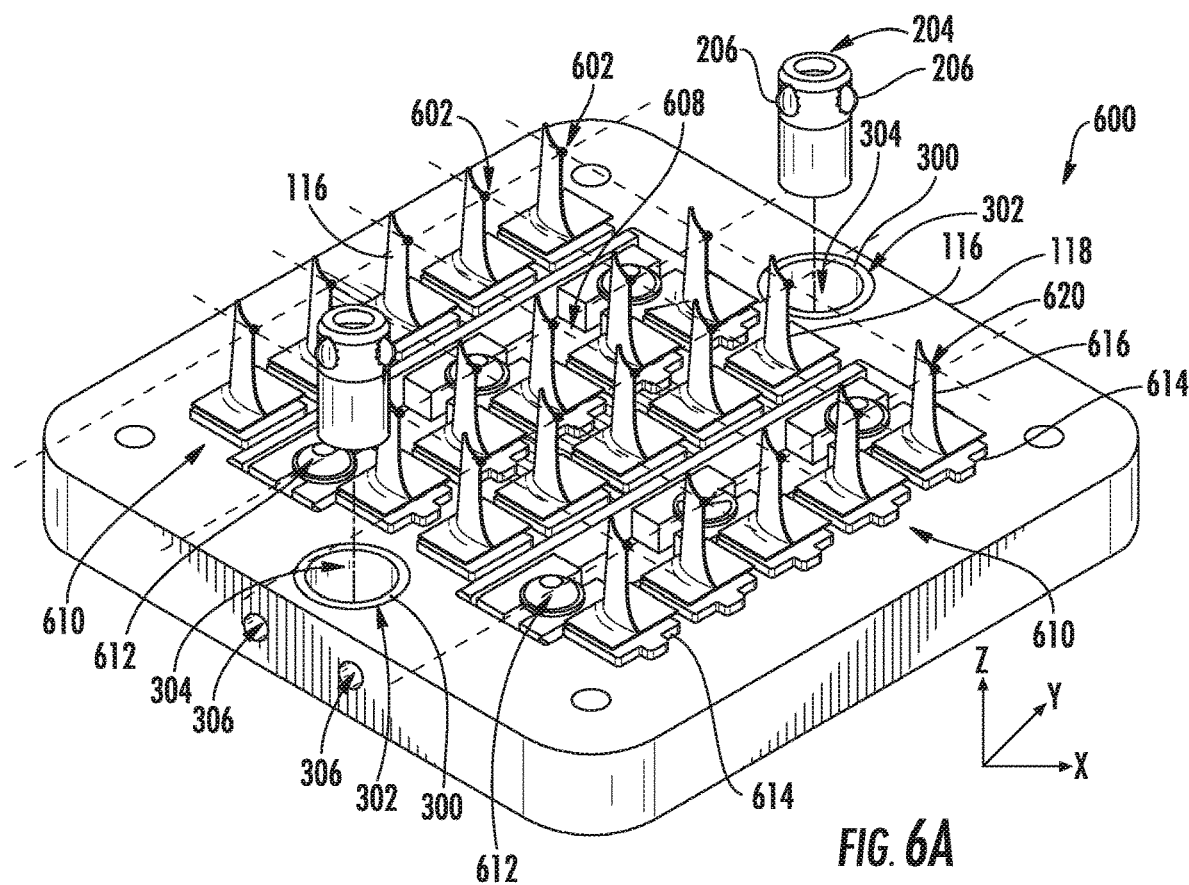
FIG. 6A schematically depicts an exemplary workpiece-assembly that includes a plurality of workpieces secured to a build plate.
Figure 6B:
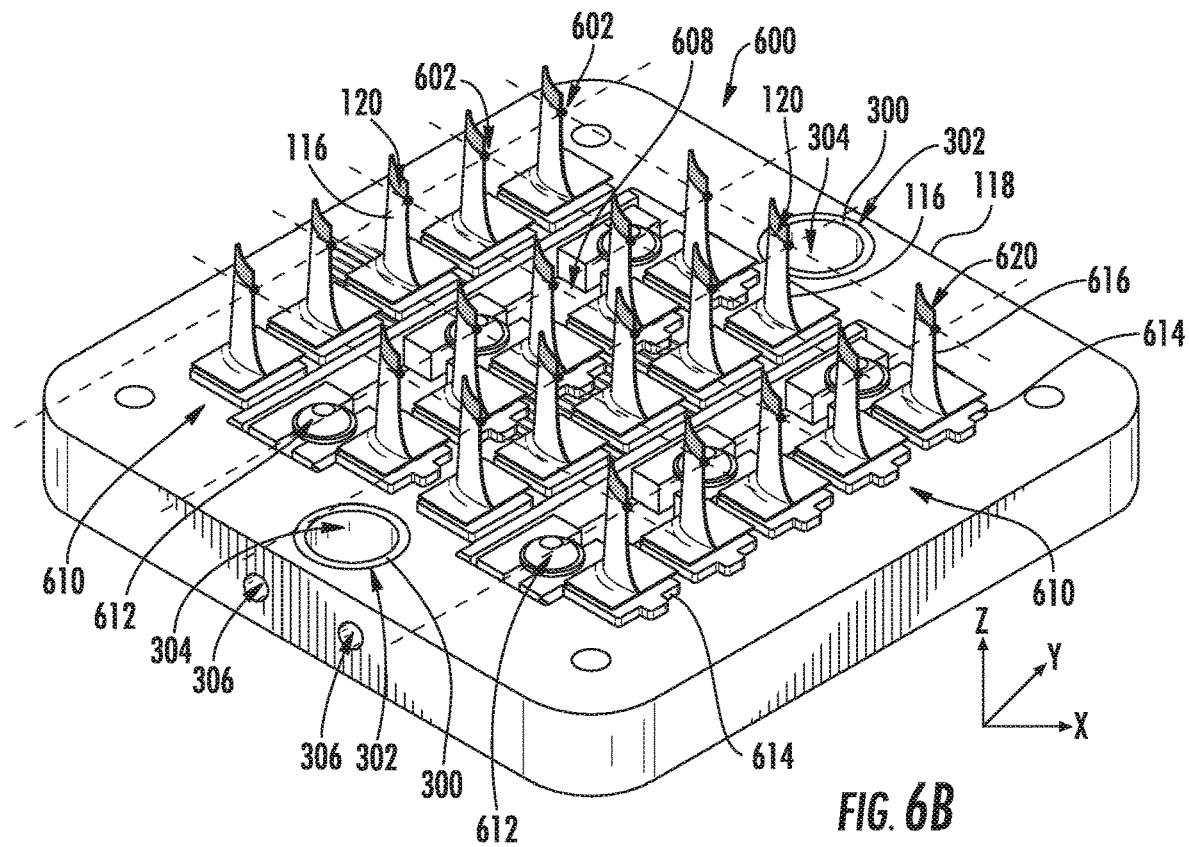
FIG. 6B schematically depicts the exemplary workpiece-assembly of FIG. 6A, with a plurality of components by additively printing extension segments the plurality of workpieces secured to the build plate.

Referring now to FIGS. 6A and 6B, an exemplary workpiece-assembly 600 that includes a plurality of workpieces 116 secured to a build plate 118 is shown. The build plate 118 may be configured to align the workpieces 116 to respective registration points 602. The registration points 602 may be mapped to a coordinate system, and the build plate-clamping assembly 500 may be configured to lockingly engage a build plate 118 to a build plate-receiving surface 202 of a work station such as a vision system-work station 124 or an additive manufacturing-work station 142, so as to align the build plate 118 to the coordinate system such that the workpieces 116 may be aligned to the respective registration points 602. FIG. 6A shows a workpiece-assembly 600 that includes a plurality of workpieces 116 secured to a build plate 118.

A build plate-clamping assembly 500 may be used to facilitate additively printing an extension segment 606 on a workpiece 116, including additively printing respective ones of a plurality of extension segments 606 on respective ones of a plurality of workpieces 116 as part of a single build. In some embodiments, a build plate-clamping assembly 500 may be configured to align the workpieces 116 to respective registration points 602 so as to facilitate image capture by the vision system 102, so as to facilitate alignment of CAD models with the workpieces 116 (e.g., so that extension segments 606 as defined by a CAD model may be properly additively printed on the workpieces 116), and/or so as to facilitate operability of the additive manufacturing machine 104.

The arrangement depicted in FIG. 6A reflects a point in time prior to additively printing extension segments onto the workpiece-interfaces 120. A build plate-clamping assembly 500 may be configured to lockingly engage a build plate 118 on a vision system-work station 124 with one or more vision system-lock-pins 126, so as to align the build plate 118 to vision system-coordinates. The plurality of workpieces 116 may be secured to the build plate 118, as shown in FIG. 6A, either before or after the build plate 118 is lockingly engaged with the build plate-receiving surface 202 of the vision system-work station 124. The vision system 102 may obtain one or more digital representations of a workpiece-interface 120 of each of a plurality of workpieces 116 secured to the build plate 118, with the workpieces 116 may be aligned to the respective registration points 602. The digital representations may be obtained using one or more cameras 112 of the vision system 102. The one or more cameras may be configured to provide one or more fields of view 114 that include the workpiece-interface 120 of each of the plurality of workpieces 116 secured to the build plate 118.

The arrangement depicted in FIG. 6B shows the workpiece-assembly 600 of FIG. 6A but reflecting a point in time after an additive printing process. The build plate-clamping assembly 500 may be configured to lockingly engage the build plate 118 on an additive manufacturing-work station 142 with one or more additive manufacturing machine-lock-pins 144, so as to align the build plate 118 to manufacturing machine-coordinates. As shown in FIG. 6B, the additive manufacturing machine 104 may form a plurality of components 604 by performing an additive printing process configured to additively print respective ones of a plurality of extension segments 606 onto respective ones of the plurality of workpieces 116.

In addition to the build plate-clamping assembly 500, the build plate 118 and/or workpiece-assembly 600 shown in FIGS. 6A and 6B may include additional features that facilitate additively printing an extension segment 606 on a workpiece 116, including additively printing respective ones of a plurality of extension segments 606 on respective ones of a plurality of workpieces 116 as part of a single build. In some embodiments, such additional features may further align the workpieces 116 to respective registration points 602 so as to facilitate image capture by the vision system 102, so as to facilitate alignment of CAD models with the workpieces 116 (e.g., so that extension segments 606 as defined by a CAD model may be properly additively printed on the workpieces 116), and/or so as to facilitate operability of the additive manufacturing machine 104.

By way of example, as shown in FIGS. 6A and 6B, such additional features of an exemplary workpiece-assembly 600 and/or build plate 118 may include one or more workpiece bays 608. Each of the one or more workpiece bays 608 may include one or more workpiece docks 610. The one or more workpiece bays 608 may additionally include one or more clamping mechanisms 612 which operate to secure one or more workpieces 116 to the build plate 118. The one or more workpiece docks 610 may be configured to receive one or more workpiece shoes 614, and the one or more workpiece shoes 614 may be respectively configured to receive a workpiece 116. The one or more clamping mechanisms 612 may be configured to clamp the workpiece shoes 614 in position within the corresponding workpiece docks 610.

A workpiece dock 610 and/or a workpiece shoe 614 may include one or more biasing members (not shown) configured to exert a biasing force (e.g., an upward or vertical biasing force) between the workpiece shoe 614 and the build plate 118 such as the bottom of the workpiece dock 610. The biasing members may include one or more springs, one or more magnet pairs (e.g. permanent magnets or electromagnets), one or more piezoelectric actuator, or the like operable to exert such a biasing force. The biasing force exerted by the biasing members biases the workpiece shoe 614 so as to allow the workpiece-interfaces 120 (e.g., the top surfaces of the workpieces 116) to be aligned with one another. By way of example, an alignment plate (not shown) may be placed on top of the workpieces 116 so as to partially compress the biasing members and bring the workpiece-interfaces 120 (e.g., the top surfaces of the workpieces 116) into alignment with one another. In some embodiments, elevating blocks (not shown) may be placed between the build plate 118 and the alignment plate (not shown) to assist in positioning the alignment plate on top of the workpieces 116 at a desired height. With the workpiece-interfaces 120 aligned with one another, the clamping mechanism 612 may be tightened so as to secure the workpieces 116 to the build plate 118.

The workpiece-assembly 600 shown in FIGS. 6A and 6B may hold any number of workpieces 116. As one example, the workpiece-assembly 600 shown may hold up to 20 workpieces 116. As another example, a workpiece-assembly 600 may be configured to hold from 2 to 100 workpieces 116, or more, such as from 2 to 20 workpieces 116, such as from 10 to 20 workpieces 116, such as from 20 to 60 workpieces 116, such as from 25 to 75 workpieces 116, such as from 40 to 50 workpieces 116, such as from 50 to 100 workpieces 116, such as from 5 to 75 workpieces 116, such as from 75 to 100 workpieces 116, such as at least 2 workpieces 116, such as at least 10 workpieces 116, such as at least 20 workpieces 116, such as at least 40 workpieces 116, such as at least 60 workpieces 116, or such as at least 80 workpieces 116.

In some embodiments, for example, when the workpieces 116 are airfoils such as compressor blades or turbine blades of a turbomachine, the workpiece-assembly 600 may be configured to hold a number of blades that corresponds to the number of blades in one or more stages of the compressor and/or turbine, as applicable. In this way, all of the blades of a given one or more stages of a turbine and/or compressor may be kept together and extension segments 606 may be additively printed thereon in one single build. It will be appreciated that the workpiece-assembly 600 and build plate 118 reflect one exemplary embodiment, which is provided by way of example and not to be limiting. Various other embodiments of a workpiece-assembly 600 and/or build plate 118 are contemplated which may also allow for the workpieces 116 to be secured with suitable positioning and alignment, all of which are within the spirit and scope of the present disclosure.

Now turning to FIGS. 7A-7C, exemplary methods of aligning a build plate 118 to coordinates of an additive manufacturing system 100 (FIG. 7A), exemplary methods of working on workpieces at multiple work stations (FIG. 7B), and exemplary methods of additively printing extension segments 606 on a plurality of workpieces 116 (FIG. 7C) will be described.

Figure 7A:
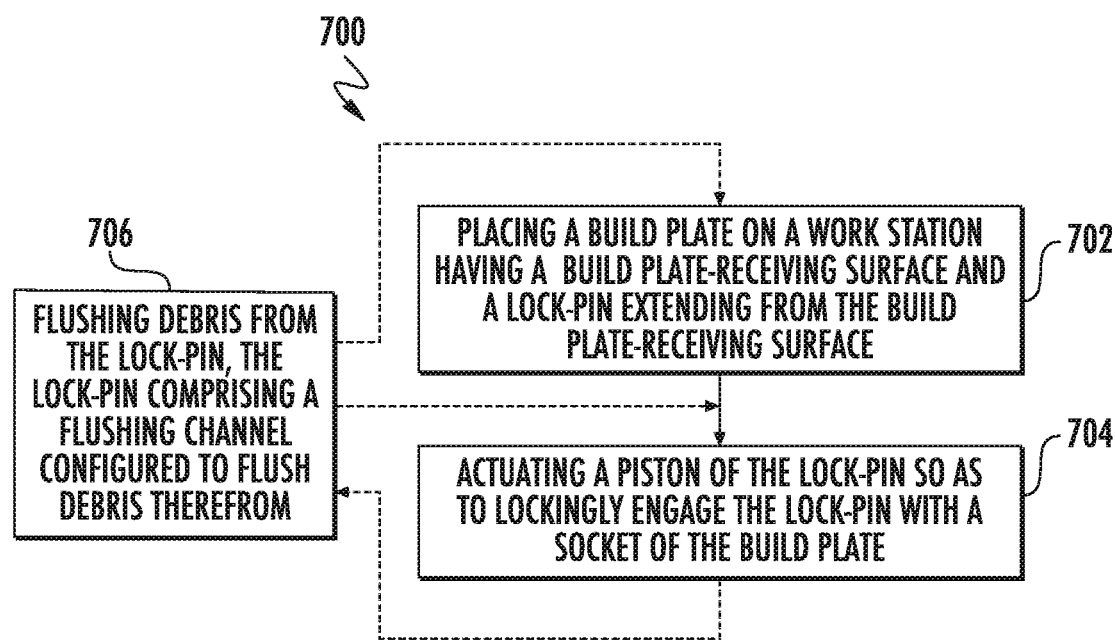
FIG. 7A shows a flowchart depicting an exemplary method of aligning a build plate to coordinates of an additive manufacturing system.

As shown in FIG. 7A, an exemplary method 700 of aligning a build plate 118 to coordinates of an additive manufacturing system 100 may include, at step 702, placing a build plate 118 on a work station 200 having a build plate-receiving surface 202 and a lock-pin 204 extending from the build plate-receiving surface 202. The lock-pin 204 may include a hollow pin body 400, a piston 402 disposed within the hollow pin body 400 such that the piston 402 is axially movable from a retracted position 502 to an actuated position 504, and a plurality of detents 206 that are radially extensible through respective ones of a plurality of detent-apertures 406 in the hollow pin body 400 responsive to the piston 402 having been axially moved to the actuated position 504. The build plate 118 may include a socket 300 having an inside surface 304 defining an engagement surface 506 for the plurality of detents 206 to lockingly engage the lock-pin 204 with the socket 300. The exemplary method 700 may further include, at step 704, actuating the piston 402 so as to lockingly engage the lock-pin 204 with the socket 300. In some embodiments, the lock-pin 204 may include a flushing channel 414 configured to flush debris from the lock-pin 204, and the exemplary method 700 may optionally include, at step 706, flushing debris from the lock-pin 204. The step 706 of flushing debris from the lock-pin 204 may be performed before, during, and/or after, step 702. Additionally, or alternatively, step 706 may be performed before, during, and/or after, step 704.

Now referring to FIG. 7B, an exemplary method 720 of working on workpieces at multiple work stations will be described. As shown in FIG. 7B, an exemplary method 720 may include, at step 722, lockingly engaging a build plate 118 at a first work station 200; at step 724, performing a first work-step on a plurality of workpieces 116 secured to the build plate 118; at step 726, releasing the build plate 118 from the first work station 200; at step 728, lockingly engaging the build plate 118 at a second work station 200; and at step 730, performing a second work-step on the plurality of workpieces 116 secured to the build plate 118. The first work station 200 may include a first lock-pin 204 extending from a first build plate-receiving surface 202, and the build plate 118 may include a socket 300 configured to lockingly engage with the first lock-pin 204. The second work station 200 may include a second lock-pin 204 extending from a second build plate-receiving surface 202, and the socket 300 of the build plate 118 may be configured to lockingly engage with the second lock-pin 204.

In some embodiments, at step 724, the first work-step may include obtaining with a vision system 102, one or more digital representations of a workpiece-interface 120 of each of the plurality of workpieces 116. Additionally, or in the alternative, at step 730, the second work-step may include additively printing on the workpiece-interfaces 120 of the plurality of workpieces 116.

In other embodiments, at step 724, the first work-step may include preparing a workpiece-interface 120 on the plurality of workpieces 116. Additionally, or in the alternative, at step 730, the second work-step may include obtaining with a vision system 102, one or more digital representations of the workpiece-interfaces 120 of the plurality of workpieces 116. Preparing a workpiece-interface 120 on the plurality of workpieces 116 may include subjecting workpieces 116 to a subtractive modification so as to provide a workpiece-interface 120 thereon. This may include cutting, grinding, machining, electrical-discharge machining, brushing, etching, polishing, or otherwise substantively modifying a workpiece 116 so as to provide a workpiece-interface 120 thereon. The subtractive modification may include removing a subtraction portion (not shown) so as to provide a workpiece-interface 120. The subtractive modification may include removing at least a portion of a surface of the workpiece 116 that has been worn or damaged. For example, the workpiece 116 may include artifacts (not shown), such as microcracks, pits, abrasions, defects, foreign material, depositions, imperfections, and the like. Such artifacts may commonly appear on the top surface of a compressor or turbine blade as a result of the extreme conditions to which such blades are subjected. The subtractive modification may additionally or alternatively be performed so as to improve bonding between the workpiece 116 and an extension segment 606 additively printed thereon.

In still further embodiments, an exemplary method 720 may optionally include, at step 732, releasing the build plate 118 from the second work station 200; at step 734, lockingly engaging the build plate 118 at a third work station 200; and at step 736, performing a third work-step on the plurality of workpieces 116 secured to the build plate 118. The third work station 200 may include a third lock-pin 204 extending from a third build plate-receiving surface 202, and the socket 300 of the build plate 118 may be configured to lockingly engage with the third lock-pin 204. By way of example, the third work-step may include additively printing on the workpiece-interfaces 120 of the plurality of workpieces 116.

Figure 7B:
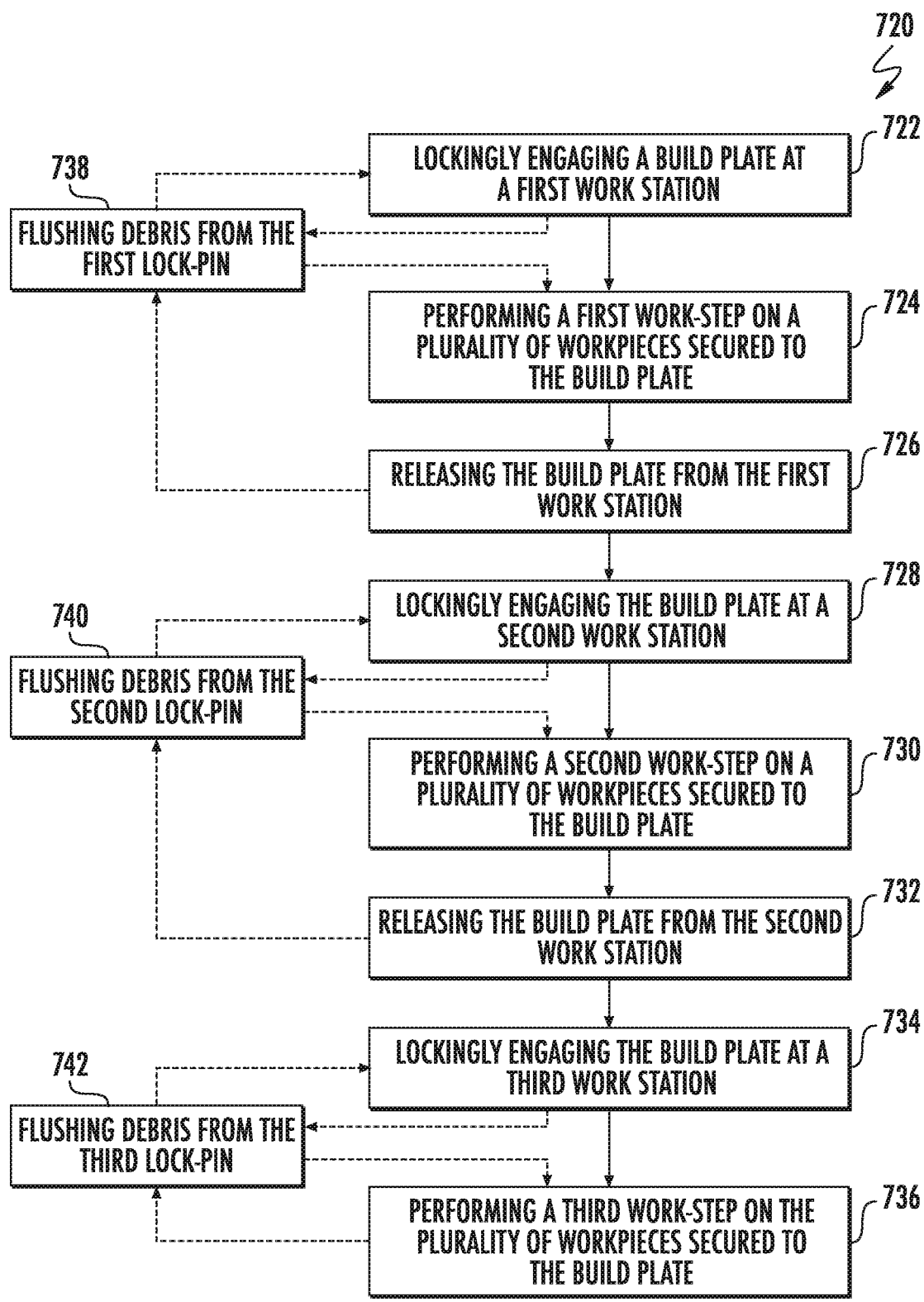
FIG. 7B shows a flowchart depicting an exemplary method of working on workpieces at multiple work stations.

Referring still to FIG. 7B, in some embodiments, the first lock-pin 204 may include a first flushing channel 414 configured to flush debris from the first lock-pin 204, and an exemplary method 720 may optionally include, at step 738, flushing debris from the first lock-pin 204 before, during, and/or after lockingly engaging the build plate 118 at the first work station 200 at step 722. Additionally, or in the alternative, the second lock-pin 204 may include a second flushing channel 414 configured to flush debris from the second lock-pin 204, and an exemplary method 720 may optionally include, at step 740, flushing debris from the second lock-pin 204 before, during, and/or after lockingly engaging the build plate 118 at the second work station 200 at step 728. Further additionally, or in the alternative, the third lock-pin 204 may include a third flushing channel 414 configured to flush debris from the third lock-pin 204, and an exemplary method 720 may optionally include, at step 742, flushing debris from the third lock-pin 204 before, during, and/or after lockingly engaging the build plate 118 at the third work station 200 at step 734.

Now referring to FIG. 7C, an exemplary method 750 of additively printing extension segments 606 on a plurality of workpieces 116 will be described. As shown in FIG. 7C, an exemplary method 750 may include, at step 752, lockingly engaging a build plate 118 on a first work station 200 associated with a vision system 102, such as a vision system-work station 124. The first work station 200 may have a first build plate-receiving surface 202 and a first lock-pin 204 extending from the first build plate-receiving surface 202. The first lock-pin 204 may have a first plurality of radially extensible detents 206. The build plate 118 may have a socket 300 with an inside surface 304 defining an engagement surface 506 for the first plurality of radially extensible detents 206 to lockingly engage the first lock-pin 204 with the socket 300.

The exemplary method 750 may further include, at step 754, obtaining with a vision system 102, one or more digital representations of a workpiece-interface 120 of each of a plurality of workpieces 116 secured to the build plate 118. The digital representations may be obtained using a vision system 102 that has one or more cameras 112 providing one or more fields of view 114 that include the workpiece-interface 120 of each of the plurality of workpieces 116 secured to the build plate 118. The one or more cameras 112 may include a field of view 114 that includes all of the workpiece interfaces 120, or the one or more cameras 112 may be moved, adjusted, articulates, or the like so as to bring various workpiece interfaces 120 into the field of view 114.

Figure 7C:
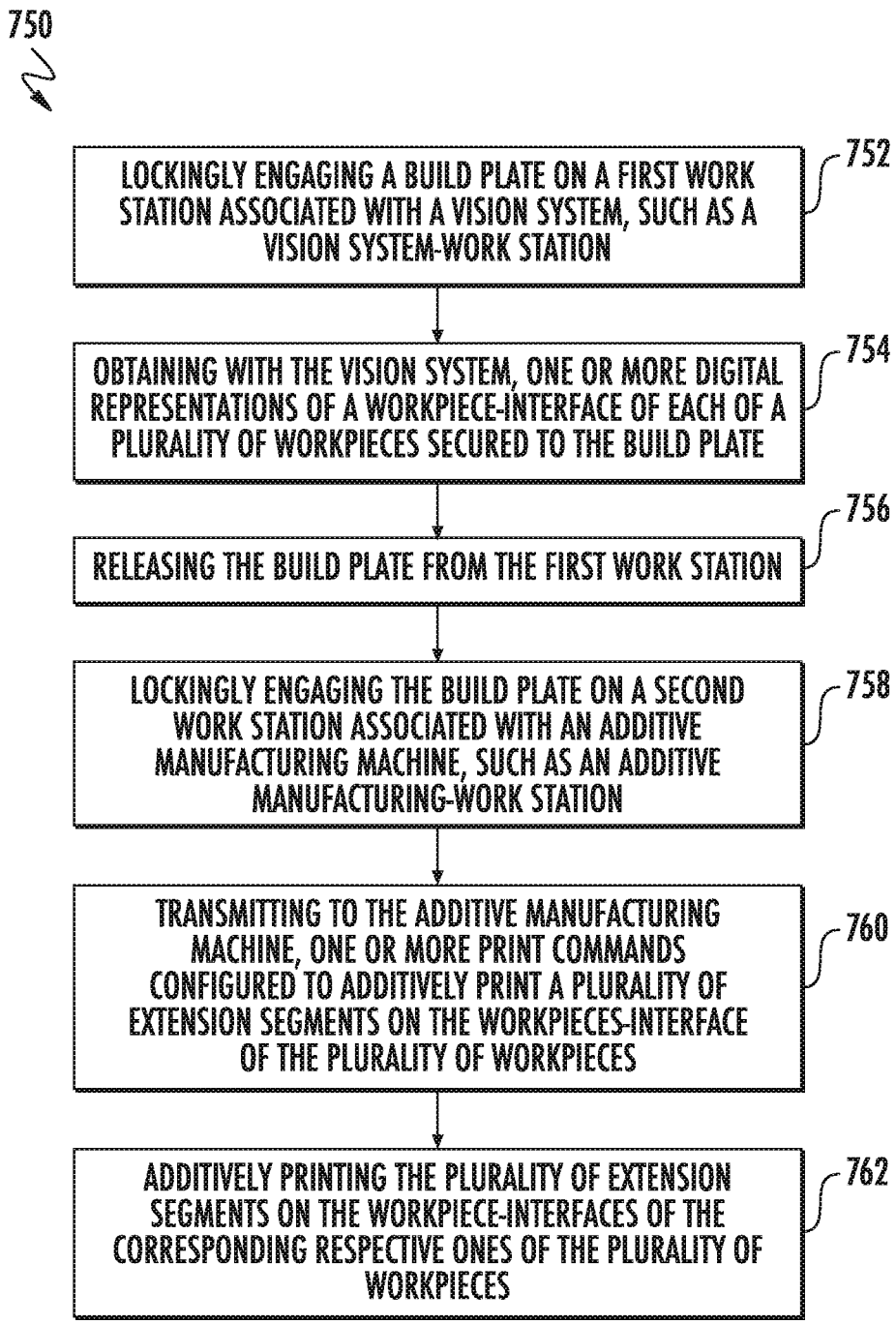
FIG. 7C shows a flowchart depicting an exemplary method of additively printing extension segments on a plurality of workpieces.

Still referring to FIG. 7C, an exemplary method 750 may further include, at step 756, releasing the build plate 118 from the first work station 200, and at step 758, lockingly engaging the build plate 118 on a second work station 200 associated with an additive manufacturing machine 104, such as an additive manufacturing-work station 142. The second work station 200 may have a second build plate-receiving surface 202 and a second lock-pin 204 extending from the second build plate-receiving surface 202, such as an additive manufacturing machine-lock-pin 144. The second lock-pin 204 may have a second plurality of radially extensible detents 206. The inside surface 304 of the socket 300 of the build plate 118 may similarly define an engagement surface 506 for the second plurality of radially extensible detents 206 to lockingly engage the second lock-pin 204 with the socket 300.

For example, a vision system-work station 124 including one or more vision system-lock-pins 126 may be coordinatedly configured with an additive manufacturing-work station 142 having one or more additive manufacturing machine-lock-pins 144. In this way, a build plate 118 may be lockingly engaged with the build plate-receiving surface 202 of the vision system-work station 124 for purposes of obtaining with one or more digital representations of a workpiece-interface 120 of each of a plurality of workpieces 116 secured to the build plate 118, and then the build plate 118 may be lockingly engaged with the build plate-receiving surface 202 of the additive manufacturing-work station 142 for purposes of additively printing extension segments 606 on the workpiece-interfaces 120 of the plurality of workpieces 116. In some embodiments, the first lock-pin 204 may align the build plate 118 to vision system-coordinates when the first lock-pin 204 lockingly engages the engagement surface 506 of the build plate 118. Additionally, or in the alternative, the second lock-pin 204 may align the build plate 118 to additive manufacturing machine-coordinates when the second lock-pin 204 lockingly engages the engagement surface 506 of the build plate 118.

Further to the exemplary method 750 of additively printing extension segments 606 on a plurality of workpieces 116, at step 760, the method 750 may include transmitting to the additive manufacturing machine 104, one or more print commands configured to additively print the plurality of extension segments 606, and at step 762, the method 750 may include additively printing the plurality of extension segments 606 on the workpiece-interfaces 120 of the plurality of workpieces 116. The one or more print commands may be generated based at least in part on the one or more digital representations obtained using the vision system 102, and the plurality of extension segments 606 may be additively printed with each respective one of the plurality of extension segments 606 being located on the workpiece-interface 120 of a corresponding respective one of the plurality of workpieces 116.

Figure 8:
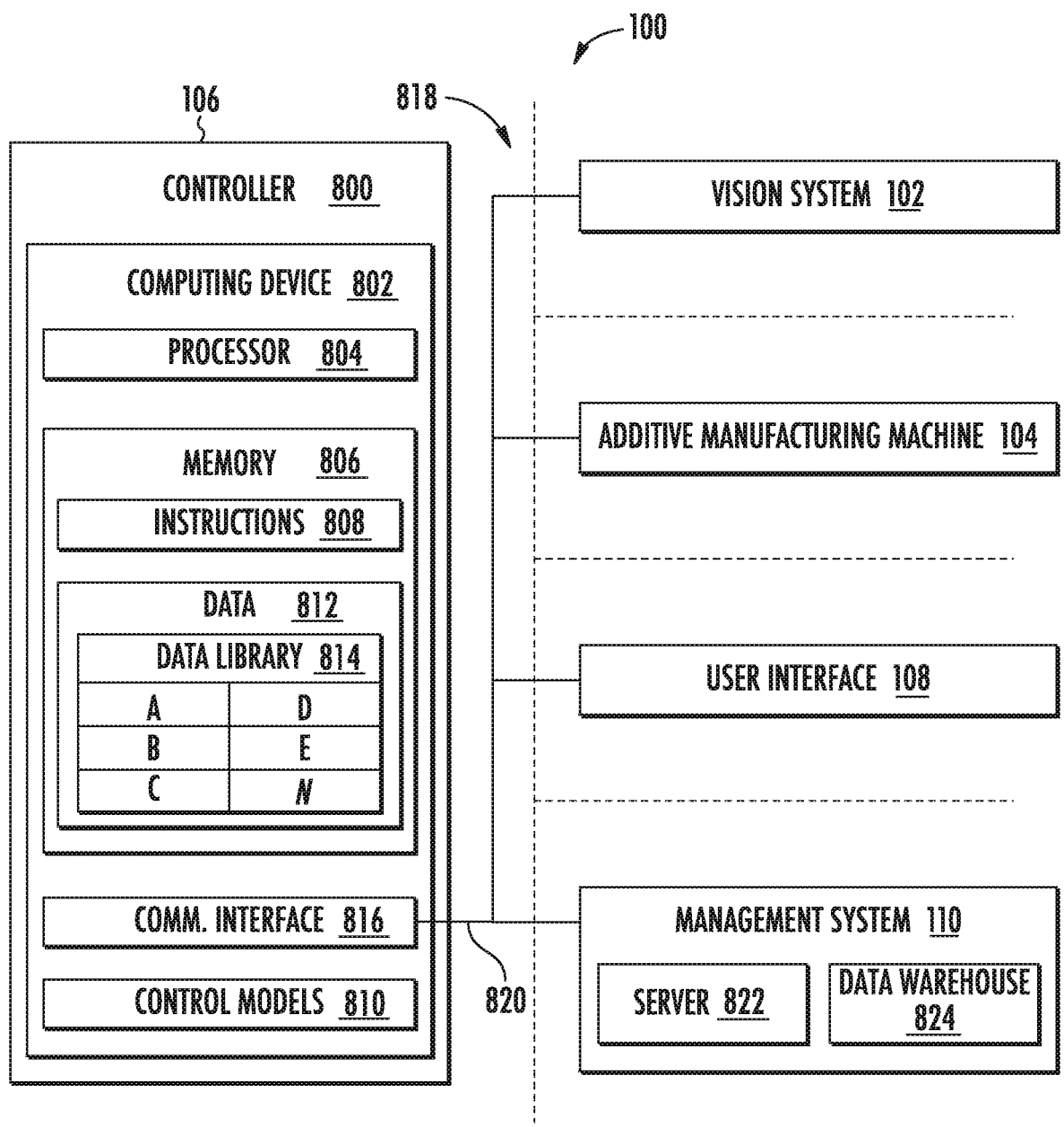
FIG. 8 shows a block diagram depicting an exemplary control system of an additive manufacturing system.

Now referring to FIG. 8, further features of an additive manufacturing system 100 will be described. As shown in FIG. 8, an exemplary additive manufacturing system 100 may include a control system 106. An exemplary control system 106 includes a controller 800 communicatively coupled with a vision system 102 and/or an additive manufacturing machine 104. The controller 800 may also be communicatively coupled with a user interface 108 and/or a management system 110.

The controller 800 may include one or more computing devices 802, which may be located locally or remotely relative to the additive vision system 102 and/or the additive manufacturing machine 104. The one or more computing devices 802 may include one or more processors 804 and one or more memory devices 806. The one or more processors 804 may include any suitable processing device, such as a microprocessor, microcontroller, integrated circuit, logic device, and/or other suitable processing device. The one or more memory devices 806 may include one or more computer-readable media, including but not limited to non-transitory computer-readable media, RAM, ROM, hard drives, flash drives, and/or other memory devices.

The one or more memory devices 806 may store information accessible by the one or more processors 804, including machine-executable instructions 808 that can be executed by the one or more processors 804. The instructions 808 may include any set of instructions which when executed by the one or more processors 804 cause the one or more processors 804 to perform operations. In some embodiments, the instructions 808 may be configured to cause the one or more processors 804 to perform operations for which the controller 800 and/or the one or more computing devices 802 are configured. Such operations may include controlling the vision system 102 and/or the additive manufacturing machine 104, including, for example, causing the vision system 102 to capture a digital representation of a field of view 114 that includes a workpiece-interface 120 of one or more workpieces 116, generating one or more print commands based at least in part on the one or more digital representations of the one or more fields of view 114, and causing the additive manufacturing machine 104 to additively print respective ones of the plurality of extension segments 606 on corresponding respective ones of the plurality of workpieces 116. For example, such instructions 808 may include one or more print commands, which, when executed by an additive manufacturing machine 104, cause an additive-manufacturing tool to be oriented with respect to a toolpath that includes a plurality of toolpath coordinates and to additively print at certain portions of the toolpath so as to additively print a layer of the plurality of extension segments 606. The layer of the plurality of extension segments 606 may correspond to a slice of an extension segment-CAD model. Such operations may additionally or alternatively include calibrating an additive manufacturing system 100.

Such operations may further additionally or alternatively include receiving inputs from the vision system 102, the additive manufacturing machine 104, the user interface 108, and/or the management system 110. Such operations may additionally or alternatively include controlling the vision system 102 and/or the additive manufacturing machine 104 based at least in part on the inputs. Such operations may be carried out according to control commands provided by a control model 810. As examples, exemplary control models 810 may include one or more control models 810 configured to determine a workpiece-interface 120 of each of a plurality of workpieces 116 from one or more digital representations of one or more fields of view 114; one or more control models 810 configured to determine and/or generate an extension segment-CAD model based at least in part on the one or more digital representations of the one or more fields of view 114; and/or one or more control models 810 configured to slice an extension segment-CAD model into a plurality of slices and/or to determine or generate a toolpath and an additive printing area for each of the plurality of slices. The machine-executable instructions 808 can be software written in any suitable programming language or can be implemented in hardware. Additionally, and/or alternatively, the instructions 808 can be executed in logically and/or virtually separate threads on processors 804.

The memory devices 806 may store data 812 accessible by the one or more processors 804. The data 812 can include current or real-time data, past data, or a combination thereof. The data 812 may be stored in a data library 814. As examples, the data 812 may include data associated with or generated by additive manufacturing system 100, including data 812 associated with or generated by a controller 800, the vision system 102, the additive manufacturing machine 104, the user interface 108, the management system 110, and/or a computing device 802. The data 812 may also include other data sets, parameters, outputs, information, associated with an additive manufacturing system 100, such as those associated with the vision system 102, the additive manufacturing machine 104, the user interface 108, and/or the management system 110.

The one or more computing devices 802 may also include a communication interface 816, which may be used for communications with a communications network 818 via wired or wireless communication lines 820. The communication interface 816 may include any suitable components for interfacing with one or more network(s), including for example, transmitters, receivers, ports, controllers, antennas, and/or other suitable components. The communication interface 816 may allow the computing device 802 to communicate with the vision system 102, the additive manufacturing machine 104. The communication network 818 may include, for example, a local area network (LAN), a wide area network (WAN), SATCOM network, VHF network, a HF network, a Wi-Fi network, a WiMAX network, a gate-link network, and/or any other suitable communications network for transmitting messages to and/or from the controller 800 across the communication lines 820. The communication lines 820 of communication network 818 may include a data bus or a combination of wired and/or wireless communication links.

The communication interface 816 may additionally or alternatively allow the computing device 802 to communicate with a user interface 108 and/or a management system 110. The management system 110, which may include a server 822 and/or a data warehouse 824. As an example, at least a portion of the data 812 may be stored in the data warehouse 824, and the server 822 may be configured to transmit data 812 from the data warehouse 824 to the computing device 802, and/or to receive data 812 from the computing device 802 and to store the received data 812 in the data warehouse 824 for further purposes. The server 822 and/or the data warehouse 824 may be implemented as part of a control system 106.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A build plate-clamping assembly, comprising:
    a work station having a build plate-receiving surface; and
    a lock-pin extending from the build plate-receiving surface of the work station, the lock-pin comprising:
        a hollow pin body;
        a piston disposed within the hollow pin body, the piston axially movable from a retracted position to an actuated position;
        a plurality of detents, the plurality of detents radially extensible through respective ones of a plurality of detent-apertures in the hollow pin body responsive to the piston having been axially moved to the actuated position; and
        a flushing channel defining a pathway for a fluid to flush debris from the lock-pin, wherein the flushing channel traverses helically along the piston and/or helically along an inner surface of the hollow pin body.

2. The build plate-clamping assembly of claim 1, comprising:
a wedging element disposed within the hollow pin body between the piston and the plurality of detents, the wedging element comprising a sloped or curved surface that slidably translates an axial movement of the piston to a radial extension of the plurality of detents responsive to the piston having been axially moved to the actuated position.

3. The build plate-clamping assembly of claim 2, wherein the detents have a spherical shape; and/or wherein the wedging element has a spherical shape.

4. The build plate-clamping assembly of claim 1, wherein the piston comprises a pneumatic piston actuable by a pneumatic fluid.

5. The build plate-clamping assembly of claim 1, wherein the lock-pin comprises a flushing fluid supply line configured to supply fluid to the flushing channel, wherein the flushing channel and the flushing fluid supply line are configured to align and thereby fluidly communicate with one another when the piston moves to a retracted position and/or when the piston moves to an actuated position.

6. The build plate-clamping assembly of claim 5, wherein the plurality of detent-apertures are in fluid communication with the flushing channel so as to allow the fluid to flush debris from the lock-pin through the plurality of detent-apertures.

7. The build plate-clamping assembly of claim 5, comprising:
one or more flushing apertures disposed about the hollow pin body, the one or more flushing apertures in fluid communication with the flushing channel so as to allow the fluid to flush debris from the lock-pin through the one or more flushing apertures.

8. The build plate-clamping assembly of claim 7, comprising:
at least one of the one or more flushing apertures disposed at an axial end of the hollow pin body.

9. The build plate-clamping assembly of claim 7, wherein the one or more flushing apertures comprises a plurality of flushing apertures disposed about at least one of the plurality of detent-apertures.

10. The build plate-clamping assembly of claim 1, comprising:
a build plate configured to be clamped to the work station at least in part by the lock-pin, the build plate comprising a socket having an inside surface defining an engagement surface for the plurality of detents to lockingly engage the lock-pin with the socket.

11. The build plate-clamping assembly of claim 10, wherein the build plate comprises a socket-receiving recess configured to receive the socket, the socket comprising an outside surface corresponding to the socket-receiving recess.

12. The build plate-clamping assembly of claim 11, wherein the build plate comprises a socket bolt-receiving bore intersecting the socket-receiving recess, the socket bolt-receiving bore configured to receive a socket locking-bolt insertable therein, wherein the outside surface of the socket comprises a socket bolt-engaging channel aligning with the intersecting socket bolt-receiving bore, the socket being lockingly engageable with the build plate at least in part by the socket locking-bolt having been inserted into the socket bolt-receiving bore and engaging with the socket bolt-engaging channel.

13. The build plate-clamping assembly of claim 11, wherein the build plate comprises a first socket bolt-receiving bore intersecting a first side of the socket-receiving recess and a second a socket bolt-receiving bore intersecting a second side of the socket-receiving recess, the first socket bolt-receiving bore configured to receive a first socket locking-bolt insertable therein and a second socket bolt-receiving bore configured to receive a second socket locking-bolt insertable therein, wherein first socket bolt-receiving bore and the second socket bolt-receiving bore align with a socket bolt-engaging channel on the outside surface of the socket, the socket being lockingly engageable with the build plate at least in part by the first socket locking-bolt having been inserted into the first socket bolt-receiving bore and engaging with the socket bolt-engaging channel and/or the second socket locking-bolt having been inserted into the second socket bolt-receiving bore and engaging with the socket bolt-engaging channel.

14. The build plate-clamping assembly of claim 11, wherein the build plate comprises one or more socket bolts respectively inserted into a corresponding one or more socket bolt-receiving bores, the one or more socket bolt-receiving bores intersecting the socket-receiving recess, wherein the socket comprises a socket bolt-engaging channel disposed about at least a portion of an outer surface of the respective socket, the one or more socket bolts lockingly engaging with the socket bolt-engaging channel.

15. A method working on workpieces at multiple work stations, the method comprising:
lockingly engaging a build plate at a first work station, the first work station having a first lock-pin extending from a first build plate-receiving surface, and the build plate comprising a socket configured to lockingly engage with the first lock-pin;
performing a first work-step on a plurality of workpieces secured to the build plate;
releasing the build plate from the first work station;
lockingly engaging the build plate at a second work station, the second work station having a second lock-pin extending from a second build plate-receiving surface, and the socket of the build plate configured to lockingly engage with the second lock-pin; and
performing a second work-step on the plurality of workpieces secured to the build plate;
wherein the first lock-pin comprises: a first hollow pin body, a first piston disposed within the first hollow pin body, the first piston axially movable from a first retracted position to a first actuated position, and a first plurality of detents, the first plurality of detents radially extensible through respective ones of a first plurality of detent-apertures in the first hollow pin body responsive to the first piston having been axially moved to the first actuated position;
wherein the second lock-pin comprises: a second hollow pin body, a second piston disposed within the second hollow pin body, the second piston axially movable from a second retracted position to a second actuated position, and a second plurality of detents, the second plurality of detents radially extensible through respective ones of a second plurality of detent-apertures in the second hollow pin body responsive to the second piston having been axially moved to the second actuated position; and
wherein the method comprises at least one of:
flushing debris from the first lock-pin before, during, and/or after lockingly engaging the build plate at the first work station, the first lock-pin comprising a first flushing channel defining a first pathway for fluid to flush debris from the first lock-pin, and wherein the first flushing channel traverses helically along the first piston and/or helically along an inner surface of the first hollow pin body, and flushing debris from the second lock-pin before, during, and/or after lockingly engaging the build plate at the second work station, the second lock-pin comprising a second flushing channel defining a second pathway for fluid to flush debris from the second lock-pin, and wherein the second flushing channel traverses helically along the second piston and/or helically along an inner surface of the second hollow pin body.

16. The method of claim 15, wherein:

the first work-step comprises obtaining with a vision system, one or more digital representations of a workpiece-interface of each of the plurality of workpieces; and/or the second work-step comprises additively printing on the workpiece-interfaces of the plurality of workpieces.

17. The method of claim 15, wherein:

the first work-step comprises preparing a workpiece-interface on the plurality of workpieces; and/or the second work-step comprises obtaining with a vision system, one or more digital representations of the workpiece-interfaces of the plurality of workpieces.

18. The method of claim 17, comprising:

releasing the build plate from the second work station;

lockingly engaging the build plate at a third work station, the third work station having a third lock-pin extending from a third build plate-receiving surface, and the socket of the build plate configured to lockingly engage with the third lock-pin; and performing a third work-step on the plurality of workpieces secured to the build plate, wherein the third work-step comprises additively printing on the workpiece-interfaces of the plurality of workpieces.

19. The build plate-clamping assembly of claim 1, wherein the lock-pin comprises:

a plurality of flushing apertures disposed about respective ones of the plurality of detent-apertures, the plurality of flushing apertures in fluid communication with the flushing channel.

20. A build plate-clamping assembly, comprising:

a work station having a build plate-receiving surface; and a lock-pin extending from the build plate-receiving surface of the work station, the lock-pin comprising:

a hollow pin body;

a piston disposed within the hollow pin body, the piston axially movable from a retracted position to an actuated position;

a plurality of detents, the plurality of detents radially extensible through respective ones of a plurality of detent-apertures in the hollow pin body responsive to the piston having been axially moved to the actuated position;

a flushing channel defining a pathway for a fluid to flush debris from the lock-pin; and a flushing fluid supply line configured to supply fluid to the flushing channel; wherein the flushing channel and the flushing fluid supply line are configured to align and thereby fluidly communicate with one another when the piston moves to a retracted position and/or when the piston moves to an actuated position.

\* \* \* \* \*